United States Patent
Berry et al.

(10) Patent No.: US 10,655,541 B2
(45) Date of Patent: May 19, 2020

(54) SEGMENTED ANNULAR COMBUSTION SYSTEM

(71) Applicant: General Electric Company, Schenectady, NY (US)

(72) Inventors: Jonathan Dwight Berry, Simpsonville, SC (US); Michael John Hughes, Pittsburgh, PA (US)

(73) Assignee: General Electric Company, Schnectady, NY (US)

( * ) Notice: Subject to any disclaimer, the term of this patent is extended or adjusted under 35 U.S.C. 154(b) by 585 days.

(21) Appl. No.: 15/442,292

(22) Filed: Feb. 24, 2017

(65) Prior Publication Data

US 2017/0299186 A1   Oct. 19, 2017

Related U.S. Application Data

(60) Provisional application No. 62/313,232, filed on Mar. 25, 2016.

(51) Int. Cl.
   F23R 3/00    (2006.01)
   F23R 3/28    (2006.01)
   (Continued)

(52) U.S. Cl.
   CPC ............. *F02C 7/18* (2013.01); *F02C 7/22* (2013.01); *F02C 7/222* (2013.01); *F23R 3/002* (2013.01);
   (Continued)

(58) Field of Classification Search
   CPC ...... F23R 3/06; F23R 3/34; F23R 3/42; F23R 3/46; F23R 3/002; F23R 3/00;
   (Continued)

(56) References Cited

U.S. PATENT DOCUMENTS 2,595,999 A   5/1952   Way et al.
2,625,792 A   1/1953   McCarthy et al.
(Continued)

FOREIGN PATENT DOCUMENTS

WO   WO2014191495 A1   12/2014

OTHER PUBLICATIONS

Nishimura, et al., The Approach to the Development of the Next Generation Gas Turbine and History of Tohoku Electric Power Company Combined Cycle Power Plants, GT2011-45464, Proceedings of ASME Turbo Expo 2011, Vancouver, British Columbia, Canada, Jun. 6-10, 2011, pp. 1-6.
(Continued)

*Primary Examiner* — Todd E Manahan
*Assistant Examiner* — Sean V Meiller
(74) *Attorney, Agent, or Firm* — Dority & Manning, P.A.

(57) ABSTRACT

The present disclosure is directed to a segmented annular combustion system including a first panel fuel injector including a premix air plenum, a fuel plenum, and a plurality of first side premixing channels, where each first side premixing channel is in fluid communication with the premix air plenum, the fuel plenum, and a respective first side injection aperture of a plurality of first side injection apertures. A second panel fuel injector is circumferentially spaced from the first panel fuel injector and includes a premix air plenum, a fuel plenum, and a plurality of second side premixing channels where each second side premixing channel is in fluid communication with the premix air plenum, the fuel plenum, and a respective second side injection aperture of a plurality of second side injection apertures. A fuel nozzle is disposed circumferentially between the first panel fuel injection and the second panel fuel injector.

32 Claims, 17 Drawing Sheets

(51) Int. Cl.
*F23R 3/34* (2006.01)
*F02C 7/18* (2006.01)
*F02C 7/22* (2006.01)
*F23R 3/10* (2006.01)
*F23R 3/06* (2006.01)
*F02C 3/04* (2006.01)

(52) U.S. Cl.
CPC ............... *F23R 3/005* (2013.01); *F23R 3/06* (2013.01); *F23R 3/10* (2013.01); *F23R 3/28* (2013.01); *F23R 3/283* (2013.01); *F23R 3/286* (2013.01); *F23R 3/34* (2013.01); *F23R 3/346* (2013.01); *F02C 3/04* (2013.01); *F05D 2220/32* (2013.01); *F05D 2240/35* (2013.01); *F05D 2260/201* (2013.01); *F05D 2260/202* (2013.01)

(58) Field of Classification Search
CPC ...... F23D 14/06; F23D 14/48; F23D 14/6264; F23D 14/78; F23D 11/00; F23D 11/40; F23D 11/36; F23D 2900/14641
See application file for complete search history.

(56) References Cited

U.S. PATENT DOCUMENTS

| | | | |
|---|---|---|---|
| 3,657,882 A | 4/1972 | Hugoson | |
| 3,657,883 A | 4/1972 | DeCorso | |
| 3,750,398 A | 8/1973 | Adeelizzi et al. | |
| 4,016,718 A | 4/1977 | Lauck | |
| 4,158,949 A | 6/1979 | Reider | |
| 4,195,474 A | 4/1980 | Bintz et al. | |
| 4,297,843 A | 11/1981 | Sato et al. | |
| 4,373,327 A | 2/1983 | Adkins | |
| 4,413,470 A | 11/1983 | Scheihing et al. | |
| 4,422,288 A | 12/1983 | Steber | |
| 4,614,082 A | 9/1986 | Sterman et al. | |
| 4,719,748 A | 1/1988 | Davis, Jr. et al. | |
| 4,720,970 A | 1/1988 | Hudson et al. | |
| 4,819,438 A | 4/1989 | Schultz | |
| 4,843,825 A | 7/1989 | Clark | |
| 4,903,477 A | 2/1990 | Butt | |
| 5,237,813 A | 8/1993 | Harris et al. | |
| 5,239,818 A | 8/1993 | Stickles et al. | |
| 5,297,385 A | 3/1994 | Dubell et al. | |
| 5,335,491 A * | 8/1994 | Barbier | F23R 3/34 60/39.37 |
| 5,761,898 A | 6/1998 | Barnes et al. | |
| 5,826,430 A | 10/1998 | Little | |
| 5,906,093 A | 5/1999 | Coslow et al. | |
| 5,924,288 A | 7/1999 | Fortuna et al. | |
| 5,960,632 A | 10/1999 | Abuaf et al. | |
| 6,082,111 A | 7/2000 | Stokes | |
| 6,085,514 A | 7/2000 | Benim et al. | |
| 6,098,397 A | 8/2000 | Glezer et al. | |
| 6,109,019 A | 8/2000 | Sugishita | |
| 6,116,013 A | 9/2000 | Moller | |
| 6,116,018 A | 9/2000 | Tanimura et al. | |
| 6,276,142 B1 | 8/2001 | Putz | |
| 6,298,656 B1 | 10/2001 | Donovan et al. | |
| 6,345,494 B1 | 2/2002 | Coslow | |
| 6,374,593 B1 | 4/2002 | Ziegner | |
| 6,412,268 B1 | 7/2002 | Cromer et al. | |
| 6,450,762 B1 | 9/2002 | Munshi | |
| 6,463,742 B2 | 10/2002 | Mandai et al. | |
| 6,523,352 B1 | 2/2003 | Takahashi et al. | |
| 6,546,627 B1 | 4/2003 | Sekihara et al. | |
| 6,568,187 B1 | 5/2003 | Jorgensen et al. | |
| 6,619,915 B1 | 9/2003 | Jorgensen | |
| 6,644,032 B1 | 11/2003 | Jorgensen et al. | |
| 7,010,921 B2 | 3/2006 | Intile et al. | |
| 7,056,093 B2 | 6/2006 | Self et al. | |
| 7,310,938 B2 | 12/2007 | Marcum et al. | |
| 7,334,960 B2 | 2/2008 | Glessner et al. | |
| RE40,658 E | 3/2009 | Powis et al. | |
| 7,665,309 B2 | 2/2010 | Parker et al. | |
| 7,707,833 B1 * | 5/2010 | Bland | F23R 3/286 60/737 |
| 7,874,138 B2 * | 1/2011 | Rubio | F23M 9/06 60/39.37 |
| 7,886,517 B2 | 2/2011 | Chopra et al. | |
| 8,015,818 B2 | 9/2011 | Wilson et al. | |
| 8,104,292 B2 | 1/2012 | Lee et al. | |
| 8,151,570 B2 | 4/2012 | Jennings et al. | |
| 8,272,218 B2 | 9/2012 | Fox et al. | |
| 8,281,594 B2 | 10/2012 | Wiebe | |
| 8,375,726 B2 | 2/2013 | Wiebe et al. | |
| 8,387,391 B2 | 3/2013 | Patel et al. | |
| 8,387,398 B2 | 3/2013 | Martin et al. | |
| 8,499,566 B2 | 8/2013 | Lacy et al. | |
| 8,549,861 B2 | 10/2013 | Huffman | |
| 8,572,980 B2 * | 11/2013 | Winkler | F23R 3/34 60/742 |
| 8,752,386 B2 | 6/2014 | Fox et al. | |
| 8,851,402 B2 * | 10/2014 | Dinu | F23R 3/286 239/401 |
| 9,016,066 B2 | 4/2015 | Wiebe et al. | |
| 9,097,184 B2 * | 8/2015 | Stryapunin | F02C 7/22 |
| 9,188,335 B2 * | 11/2015 | Uhm | F23L 7/005 |
| 9,255,490 B2 | 2/2016 | Mizukami et al. | |
| 9,476,592 B2 * | 10/2016 | Berry | F23R 3/10 |
| 9,512,781 B2 | 12/2016 | Mizukami et al. | |
| 9,599,343 B2 * | 3/2017 | Abd El-Nabi | F23R 3/32 |
| 2002/0112483 A1 | 8/2002 | Kondo et al. | |
| 2003/0140633 A1 | 7/2003 | Shimizu et al. | |
| 2003/0167776 A1 | 9/2003 | Coppola | |
| 2003/0192320 A1 | 10/2003 | Farmer et al. | |
| 2006/0248898 A1 | 11/2006 | Buelow et al. | |
| 2008/0208513 A1 | 8/2008 | Dupuy et al. | |
| 2010/0077719 A1 | 4/2010 | Wilson et al. | |
| 2010/0287946 A1 | 11/2010 | Buelow et al. | |
| 2011/0209482 A1 | 9/2011 | Toqan et al. | |
| 2012/0151928 A1 | 6/2012 | Patel et al. | |
| 2012/0151929 A1 | 6/2012 | Patel et al. | |
| 2012/0151930 A1 | 6/2012 | Patel et al. | |
| 2014/0260257 A1 | 9/2014 | Rullaud et al. | |
| 2014/0373548 A1 | 12/2014 | Hasselqvist et al. | |

OTHER PUBLICATIONS

U.S. Appl. No. 14/924,742, filed Oct. 28, 2015.
U.S. Appl. No. 14/944,341, filed Nov. 18, 2015.
U.S. Appl. No. 15/442,171, filed Feb. 24, 2017.
U.S. Appl. No. 15/442,203, filed Feb. 24, 2017.
U.S. Appl. No. 15/442,227, filed Feb. 24, 2017.
U.S. Appl. No. 15/442,255, filed Feb. 24, 2017.
U.S. Appl. No. 15/442,269, filed Feb. 24, 2017.
U.S. Appl. No. 15/464,394, filed Mar. 21, 2017.
U.S. Appl. No. 15/464,400, filed Mar. 21, 2017.
U.S. Appl. No. 15/464,406, filed Mar. 21, 2017.
U.S. Appl. No. 15/464,411, filed Mar. 21, 2017.
U.S. Appl. No. 15/464,419, filed Mar. 21, 2017.
U.S. Appl. No. 15/464,425, filed Mar. 21, 2017.
U.S. Appl. No. 15/464,431, filed Mar. 21, 2017.
U.S. Appl. No. 15/464,443, filed Mar. 21, 2017.
U.S. Appl. No. 15/464,452, filed Mar. 21, 2017.
U.S. Appl. No. 15/361,840, filed Nov. 28, 2016.
U.S. Appl. No. 15/406,820, filed Jan. 16, 2017.

* cited by examiner (A-A)

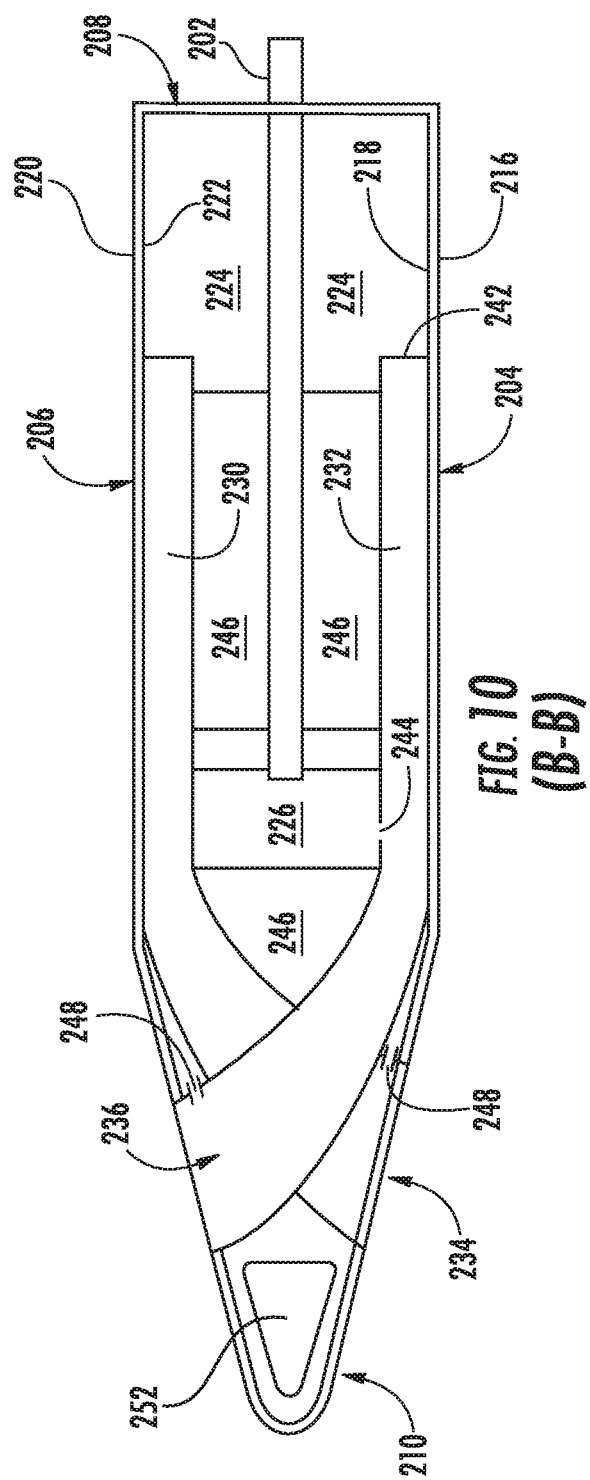
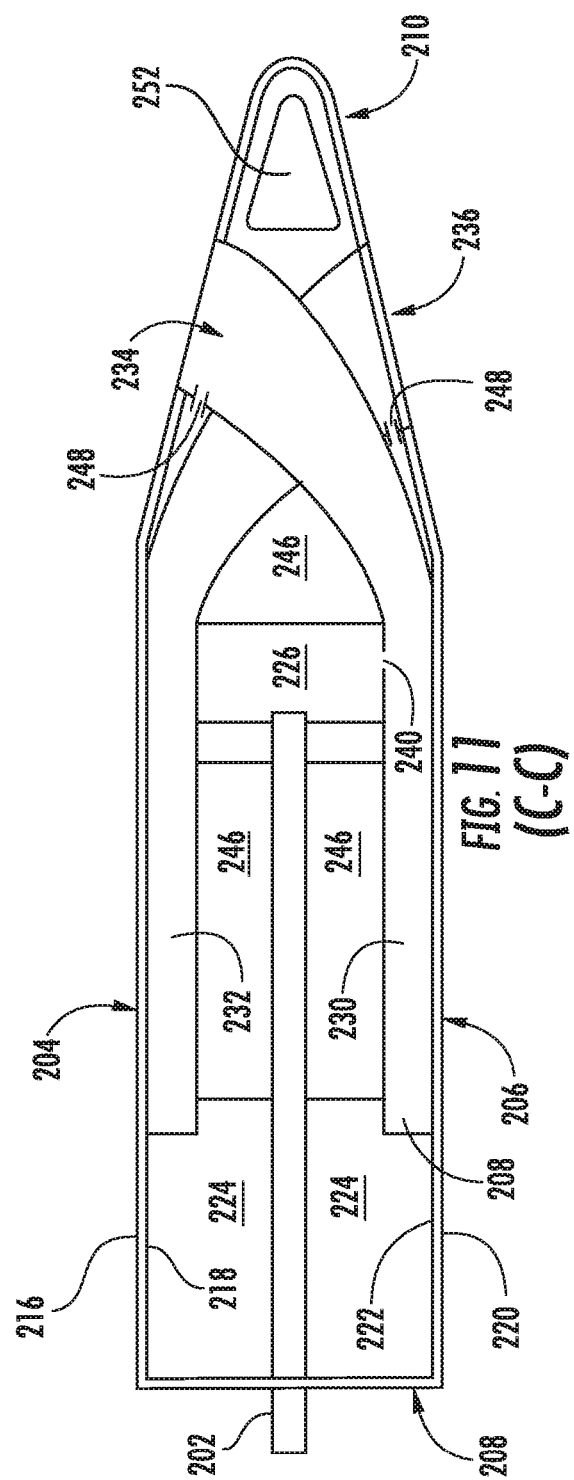

SEGMENTED ANNULAR COMBUSTION SYSTEM

CROSS REFERENCE TO RELATED APPLICATIONS

The present application claims filing benefit of U.S. Provisional Patent Application Ser. No. 62/313,232 having a filing date of Mar. 25, 2016, which is incorporated by reference herein in its entirety.

STATEMENT REGARDING FEDERALLY SPONSORED RESEARCH OR DEVELOPMENT

This invention was made with Government support under Contract No. DE-FE0023965 awarded by the United States Department of Energy. The Government has certain rights in this invention.

FIELD OF DISCLOSURE

The present disclosure generally relates to a segmented combustion system for use in a gas turbine.

BACKGROUND

Industrial gas turbine combustion systems usually burn hydrocarbon fuels and produce air polluting emissions such as oxides of nitrogen (NOx) and carbon monoxide (CO). Oxidization of molecular nitrogen in the gas turbine depends upon the temperature of gas located in a combustor, as well as the residence time for reactants located in the highest temperature regions within the combustor. Thus, the amount of NOx produced by the gas turbine may be reduced or controlled by either maintaining the combustor temperature below a temperature at which NOx is produced, or by limiting the residence time of the reactant in the combustor.

One approach for controlling the temperature of the combustor involves premixing fuel and air to create a fuel-air mixture prior to combustion. This approach may include the axial staging of fuel injectors where one or more injectors are located at an upstream end of the combustor and one or more injectors are located at an axially downstream location. The upstream injectors inject a first fuel-air mixture into a first or primary combustion zone where it is ignited to produce a main flow of high energy combustion gases. A second fuel-air mixture is injected into and mixed with the main flow of high energy combustion gases via a plurality of radially oriented and circumferentially spaced fuel injectors or axially staged fuel injector assemblies positioned downstream from the primary combustion zone.

Axially staged injection increases the likelihood of complete combustion of available fuel, which in turn reduces the air polluting emissions. However, with conventional axially staged fuel injection combustion systems there are various challenges with balancing air flow to the various combustor components, air flow requirements to the head end of the combustor for the first fuel-air mixture and/or compressed air flow to the axially staged fuel injectors for the second fuel-air mixture while maintaining emissions compliance over the full range of operation of the gas turbine. Therefore, an improved gas turbine combustion system which includes axially staged fuel injection would be useful in the industry.

BRIEF DESCRIPTION OF THE TECHNOLOGY

Aspects and advantages are set forth below in the following description, or may be obvious from the description, or may be learned through practice.

One embodiment of the present disclosure is directed to a combustion system segment. The combustion system segment includes a first panel fuel injector including a first side wall, a second side wall and a premix air plenum, a fuel plenum and a plurality of first side premixing channels defined therebetween. Each first side premixing channel of the plurality of first side premixing channels is in fluid communication with the premix air plenum, the fuel plenum and a respective first side injection aperture of a plurality of first side injection apertures defined along the first side wall. The segment also includes a second panel fuel injector circumferentially spaced from the first panel fuel injector. The second panel fuel injector includes a first side wall, a second side wall and a premix air plenum, a fuel plenum and a plurality of second side premixing channels defined therebetween. Each second side premixing channel of the plurality of second side premixing channels is in fluid communication with the premix air plenum, the fuel plenum and a respective second side injection aperture of a plurality of second side injection apertures defined along the second side wall. The segment further includes a fuel nozzle that extends circumferentially between the first side wall of the first panel fuel injection and the second side wall of the second panel fuel injector.

Another embodiment of the present disclosure is directed to a combustion system. The annular combustion system includes a plurality of panel fuel injectors arranged in an annular array about an axial centerline of the annular combustion system and a plurality of fuel nozzles. Each fuel nozzle of the plurality of fuel nozzles is disposed circumferentially between a respective adjacent pair of panel fuel injectors of the plurality of panel fuel injectors. The plurality of fuel nozzles includes a first fuel nozzle. Each adjacent pair of panel fuel injectors includes a first panel fuel injector and a second panel fuel injector. The first panel fuel injector includes a first side wall, a second side wall and a premix air plenum, a fuel plenum and a plurality of first side premixing channels defined therebetween. Each first side premixing channel of the plurality of first side premixing channels is in fluid communication with the premix air plenum, the fuel plenum and a respective first side injection aperture of a plurality of first side injection apertures defined along the first side wall. The second panel fuel is circumferentially spaced from the first panel fuel injector via the first fuel nozzle. The second panel fuel injector includes a first side wall, a second side wall and a premix air plenum, a fuel plenum and a plurality of second side premixing channels defined therebetween. Each second side premixing channel of the plurality of second side premixing channels is in fluid communication with the premix air plenum, the fuel plenum and a respective second side injection aperture of a plurality of second side injection apertures defined along the second side wall.

Those of ordinary skill in the art will better appreciate the features and aspects of such embodiments, and others, upon review of the specification.

BRIEF DESCRIPTION OF THE DRAWINGS

A full and enabling disclosure of the various embodiments, including the best mode thereof to one skilled in the art, is set forth more particularly in the remainder of the specification, including reference to the accompanying figures, in which:

FIG. 10 provides a cross-sectioned top view of the exemplary panel fuel injector taken along section line B-B as shown in FIG. 8, according to at least one embodiment of the present disclosure;

FIG. 11 provides a cross-sectioned top view of the exemplary panel fuel injector taken along section line C-C as shown in FIG. 9, according to at least one embodiment of the present disclosure;

DETAILED DESCRIPTION

Figure 1:
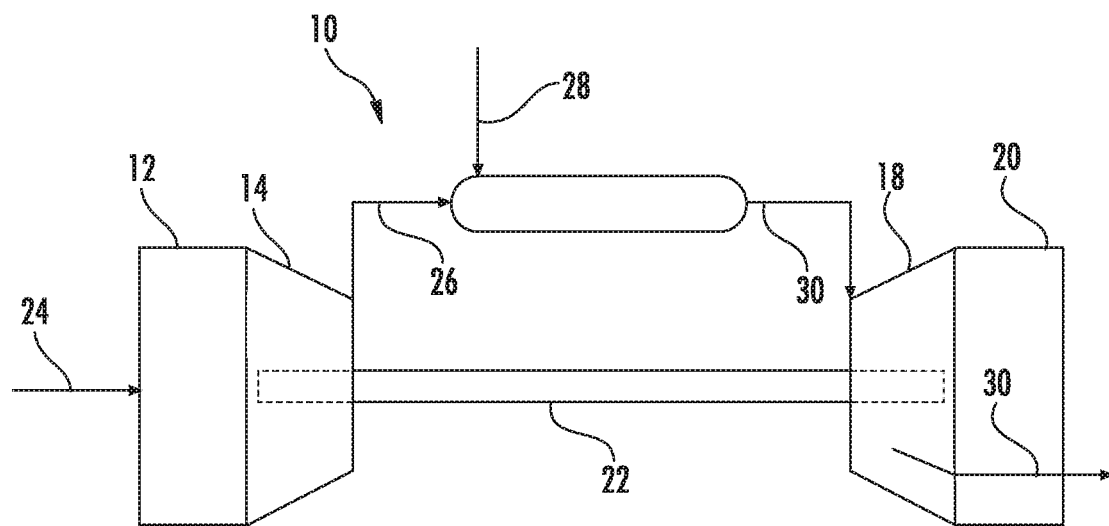
FIG. 1 is a functional block diagram of an exemplary gas turbine that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a segmented annular combustion system for a land-based power-generating gas turbine for purposes of illustration, one of ordinary skill in the art will readily appreciate that embodiments of the present disclosure may be applied to any type of turbomachine and are not limited to annular combustion systems for land-based power-generating gas turbines unless specifically recited in the claims.

Referring now to the drawings, FIG. 1 illustrates a schematic diagram of an exemplary gas turbine 10. The gas turbine 10 generally includes an inlet section 12, a compressor 14 disposed downstream of the inlet section 12, a combustion section 16 disposed downstream of the compressor 14, a turbine 18 disposed downstream of the combustion section 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustion section 16. At least a portion of the compressed air 26 is mixed with a fuel 28 within the combustion section 16 and burned to produce combustion gases 30. The combustion gases 30 flow from the combustion section 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
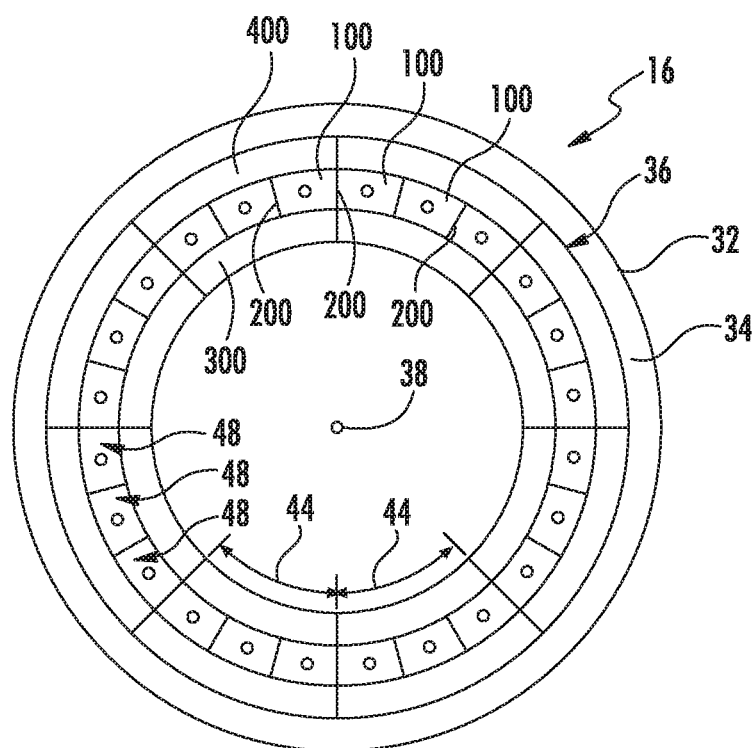
FIG. 2 is an upstream view of an exemplary combustion section of a gas turbine, according to at least one embodiment of the present disclosure.

FIG. 2 provides an upstream view of the combustion section 16, according to various embodiments of the present disclosure. As shown in FIG. 2, the combustion section 16 may be at least partially surrounded by an outer or compressor discharge casing 32. The compressor discharge casing 32 may at least partially define a high pressure plenum 34 that at least partially surrounds various components of the combustion section 16. The high pressure plenum 34 may be in fluid communication with the compressor 14 (FIG. 1) so as to receive the compressed air 26 therefrom.

In various embodiments, as shown in FIG. 2, the combustion section 16 includes a segmented annular combustion system 36. As shown in FIG. 2, the segmented annular combustion system 36 includes a series of fuel nozzles 100 and a corresponding series of hollow or semi-hollow panel fuel injectors 200 arranged in alternating fashion in an annular array about an axial centerline 38 of the combustion section 16. The panel fuel injectors 200 extend radially (with respect to centerline 38) between an inner liner 300 and an outer liner 400, which form a radially inner and a radially outer combustion gas flow boundary within the combustion section 16. The fuel nozzles 100 are disposed between the inner liner 300 and the outer liner 400, though not necessarily extending across an entire radius therebetween.

Figure 3:
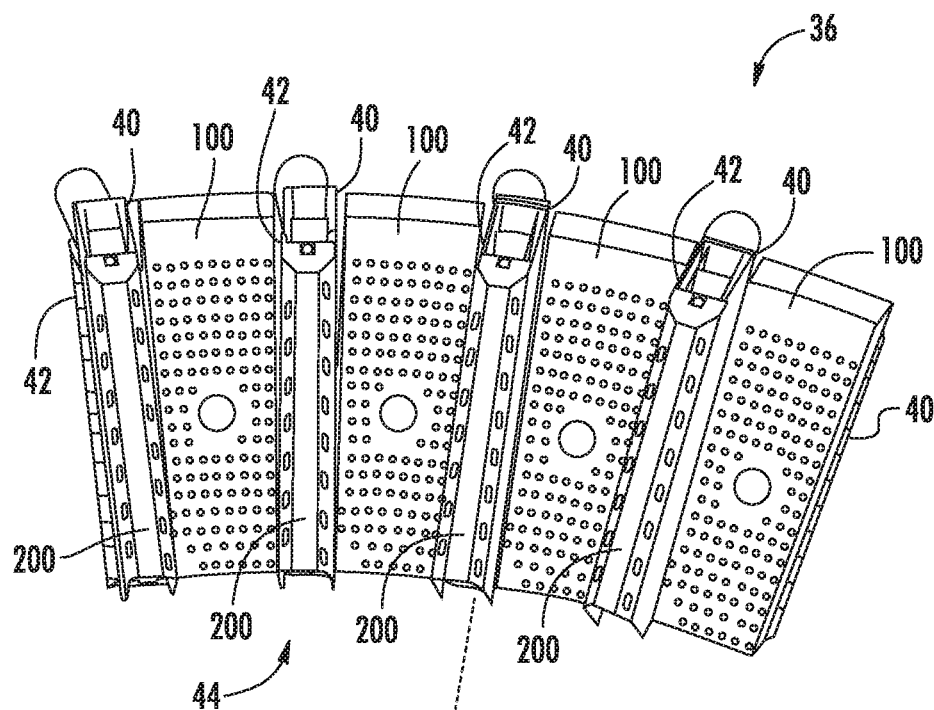
FIG. 3 provides a downstream or aft side view of a portion of an exemplary segmented annular combustion system, according to at least one embodiment of the present disclosure.
Figure 4:
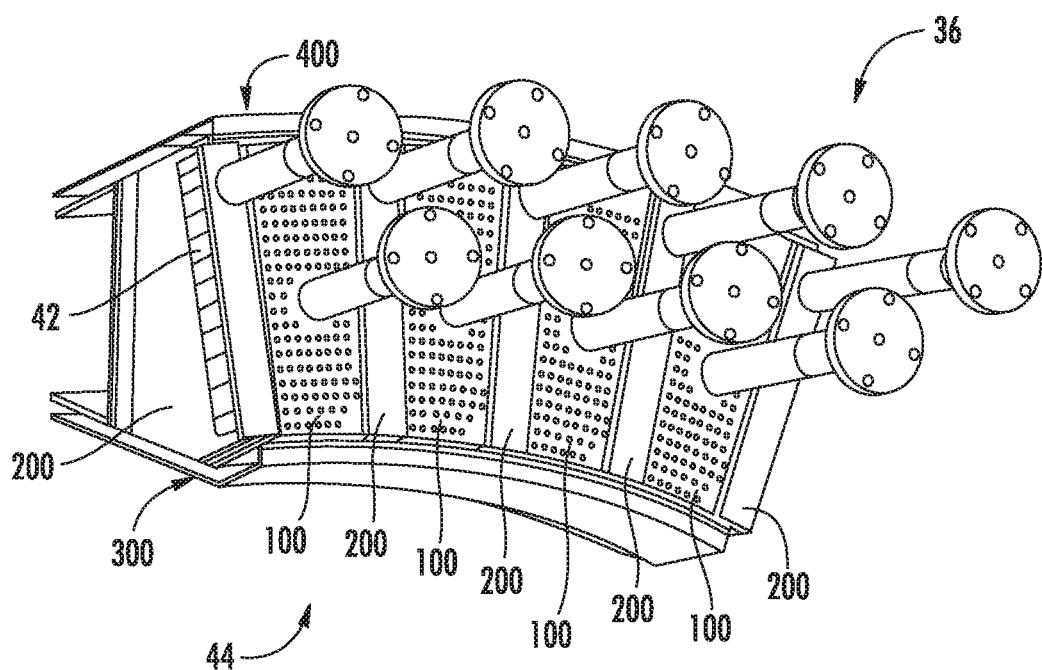
FIG. 4 provides an upstream or forward side view of a portion of the segmented annular combustion system as shown in FIG. 3, according to at least one embodiment of the present disclosure.

FIG. 3 provides a downstream or aft side view of a portion of the segmented annular combustion system 36, according to at least one embodiment of the present disclosure. FIG. 4 provides an upstream or forward side view of a portion of the segmented annular combustion system 36, according to at least one embodiment of the present disclosure. In particular embodiments, as shown in FIGS. 3 and 4 collectively, each panel fuel injector 200 circumferentially separates two circumferentially adjacent fuel nozzles 100. In the embodiments illustrated herein, the fuel nozzles 100 are shown and described as bundled tube fuel nozzles, but it should be clear that other types of fuel nozzles may be used instead. For example, one or more fuel nozzles (e.g., swozzles) or burners may be mounted in a cap face segment (not shown separately) that extends radially between the inner liner 300 and the outer liner 400 and that extends circumferentially between adjacent panel fuel injectors 200. Any reference to "bundled tube fuel nozzle 100" is intended to encompass any type of fuel nozzle, unless context dictates otherwise.

In particular embodiments, as shown in FIG. 3, a seal 40 such as a floating collar seal, spring seal, or hula seal may be attached to a side wall of one or more of the bundled tube fuel nozzles 100. In particular embodiments, as shown in FIG. 4, a seal 42 such as a floating collar seal, spring seal, or hula seal may be attached to a side wall of one or more of the panel fuel injectors 200. The seals 40, 42 may be used to prevent, reduce and/or control air leakage between adjacent bundled tube fuel nozzles 100 and respective panel fuel injectors 200 during operation of the combustion section 16.

In particular embodiments, as shown in FIGS. 2, 3 and 4 collectively, the segmented annular combustion system 36 may be subdivided into individual combustor segments 44. Each combustor segment 44 may include two or more (bundled tube) fuel nozzles 100 and at least one panel fuel injector 200. In particular embodiments, as illustrated in FIGS. 2 and 4, the inner liner 300 and/or the outer liner 400 may be subdivided into multiple sections which correspond with one or more of the combustor segments 44.

Figure 5:
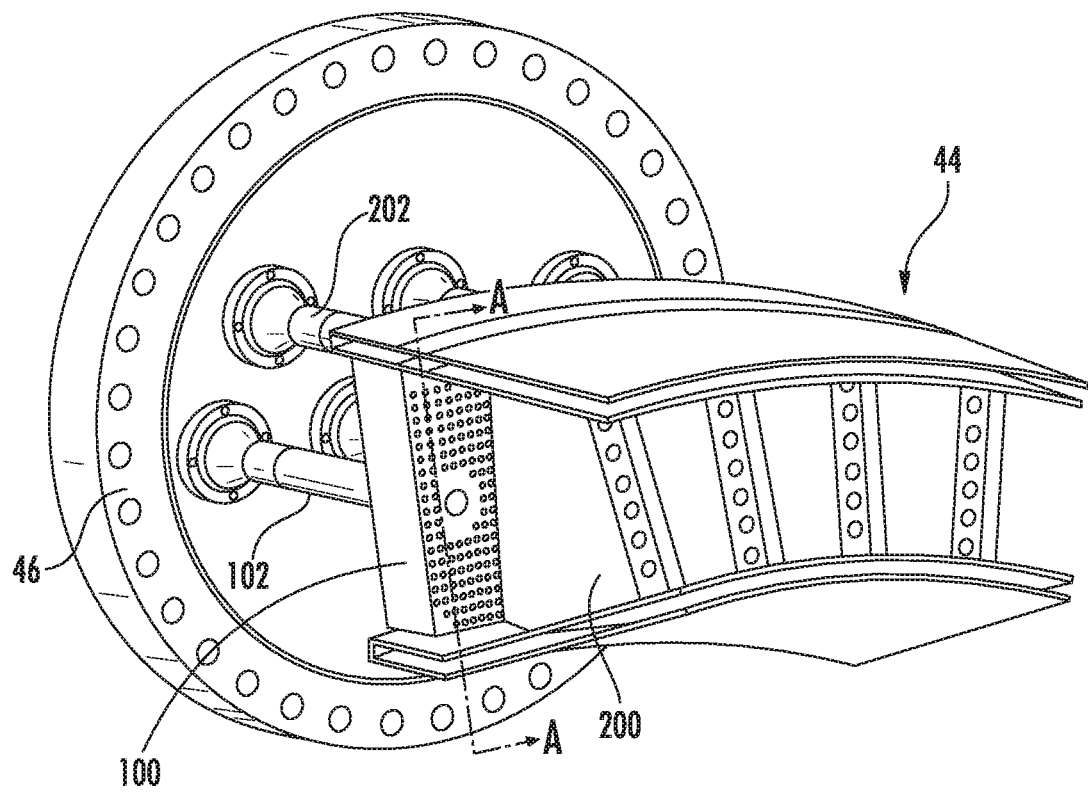
FIG. 5 provides a perspective view of the portion of the exemplary segmented annular combustion system of FIG. 3, according to at least one embodiment of the present disclosure.

FIG. 5 provides a perspective view of an exemplary combustor segment 44, according to at least one embodiment of the present disclosure. In particular embodiments, as shown in FIG. 5, one or more of the combustor segments 44 may be coupled to an end cover 46, which is formed to couple to and/or seal against the compressor discharge casing 32 (FIG. 2) of the combustion section 16. In particular embodiments, the bundled tube fuel nozzles 100 may be fluidly coupled to the end cover 46 and/or a fuel supply (not shown) via one or more fluid conduits 102. In particular embodiments, one or more of the panel fuel injectors 200 may be fluidly coupled to the end cover 46 and/or a fuel supply (not shown) via one or more fluid conduits 202.

Figure 6:
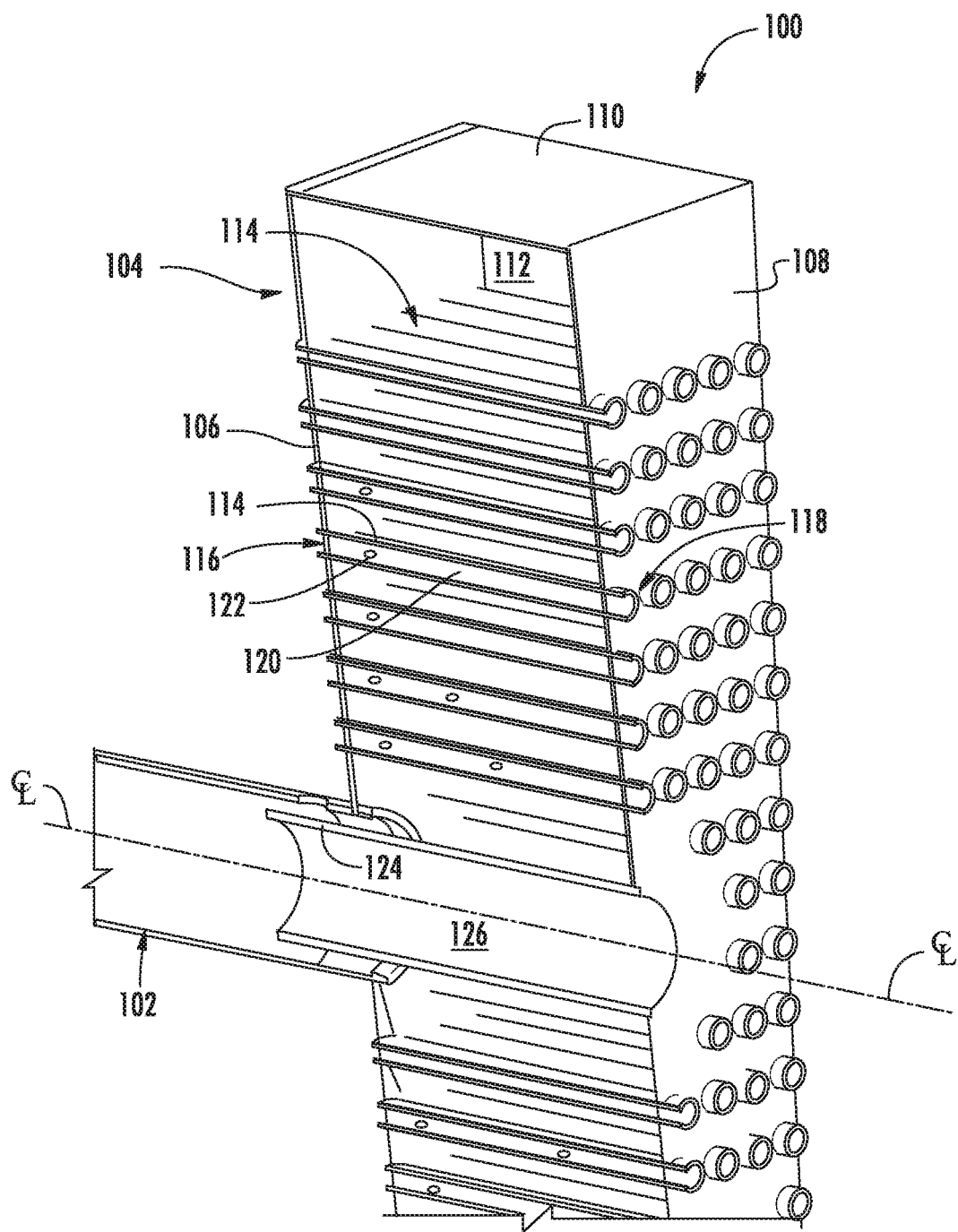
FIG. 6 provides a cross-sectioned perspective view of a portion of an exemplary bundled tube fuel nozzle taken along section line A-A as shown in FIG. 5, according to at least one embodiment of the present disclosure.

FIG. 6 provides a cross-sectioned perspective view of a portion of an exemplary bundled tube fuel nozzle 100, taken along section line A-A as shown in FIG. 5, according to at least one embodiment of the present disclosure. In various embodiments, as shown in FIG. 6, the bundled tube fuel nozzle 100 includes a housing body 104. The housing body 104 includes a forward or upstream plate or face 106, an aft or downstream plate or face 108, and an outer wall or shroud 110 that extends axially from and/or between the forward plate 106 and the aft plate 108 and that may define a radially outer perimeter of the bundled tube fuel nozzle 100. A bundled tube fuel plenum 112 is defined within the housing body 104. In particular embodiments, the bundled tube fuel plenum 112 may be at least partially defined by and/or between the forward plate 106, the aft plate 108, and the outer shroud 110.

As shown in FIG. 6, a plurality of tubes 114 extends axially through the forward plate 106, the bundled tube fuel plenum 112, and the aft plate 108. Each tube 114 of the plurality of tubes 114 includes an inlet 116 defined at or upstream from the forward plate 106 and an outlet 118 defined at or downstream from the aft plate 108. Each of the tubes 114 defines a respective premix passage 120 that extends between the respective inlet 116 and outlet 118. At least some of the tubes 114 include or define at least one fuel port 122 in fluid communication with the bundled tube fuel plenum 112. The fuel port(s) 122 provides for fluid communication from the bundled tube fuel plenum 112 into the respective premix passage 120 of the respective tube 114.

In operation, gaseous fuel (or in some embodiments, a liquid fuel reformed into a gaseous mixture) flows, via the fuel ports 122, from the bundled tube fuel plenum 112 into the respective premix passage 120 of each of the tubes 114, where the fuel mixes with air entering the respective inlet 116 of each tube 114. The fuel ports 122 may be positioned along the respective tubes 114 in a single axial plane or in more than one axial plane with respect to a centerline of the bundled tube fuel nozzle 100, for example, if a multi-tau arrangement is desired to address or tune combustion dynamics between two adjacent primary combustion zones 48 or to mitigate coherent axial modes between the segmented annular combustion system 36 and the turbine 18.

In particular embodiments, the bundled tube fuel plenum 112 may be subdivided or partitioned via a wall or other feature (not shown) into two or more bundled tube fuel plenums 112 defined within the housing body 104. In this embodiment, a first subset of tubes of the plurality of tubes 114 may be fueled via a first bundled tube fuel plenum, and a second subset of tubes of the plurality of tubes 114 may be fueled independently via a second bundled tube fuel plenum. The bundled tube fuel nozzles 100 may be made as an integrated component, via casting or additive manufacturing, to reduce costs and simplify assembly.

As shown in FIG. 6, the fluid conduit 102 may be coupled to and/or extend through the forward plate 106 and may provide for fluid communication into the bundled tube fuel plenum 112. In particular embodiments, as shown in FIG. 6, one or more of the bundled tube fuel nozzles 100 may include an inner tube 124 that extends axially within the respective fluid conduit 102 and through the respective aft plate 108. The inner tube 124 may define a cartridge or air passage 126 through the bundled tube fuel nozzle 100, which is capable of holding a liquid fuel cartridge, a sensor, an igniter, or some other component. In particular embodiments, the cartridge passage 126 may extend through the aft plate 108.

Figure 7:
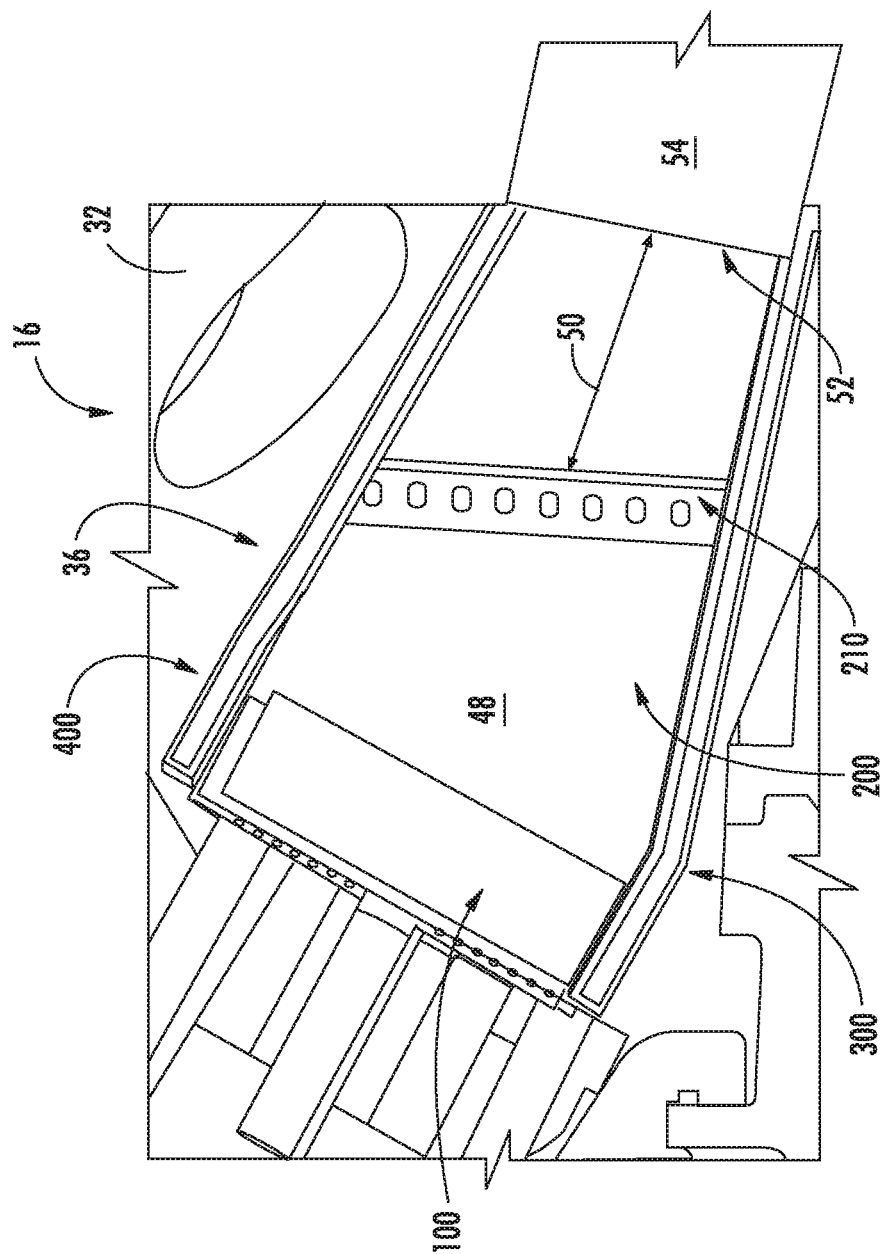
FIG. 7 provides a cross-sectioned side view of an annular combustion system mounted within an outer casing of a combustor, according to various embodiments of the present disclosure.

FIG. 7 provides a cross-sectioned side view of the annular combustion system 36 mounted within the compressor discharge casing 32 of the combustion section 16, according to various embodiments of the present disclosure. As shown in FIG. 7, the inner liner 300, the outer liner 400, and each respective panel fuel injector 200 at least partially define a primary combustion chamber or zone 48 which is defined downstream from a respective bundled tube fuel nozzle 100 of the plurality of bundled tube fuel nozzles 100. As shown in FIG. 2, the inner liner 300, the outer liner 400 and the plurality of panel fuel injectors 200 define a plurality of annularly arranged primary combustion zones 48 that are structurally and/or fluidly isolated with respect to each other. An axial gap 50 is formed between an aft end 210 of each panel fuel injector 200 and a leading edge (or forward portion) 52 of a stationary nozzle 54 disposed proximate to an inlet of the turbine (FIG. 1). The secondary combustion zones 56 are unimpeded by the panel fuel injectors 200 (that is, the secondary combustion zones 56 are distributed within a portion of the annulus between the inner liner 300 and the outer liner 400 downstream of the aft ends 210 of the panel fuel injectors 200).

Figure 8:
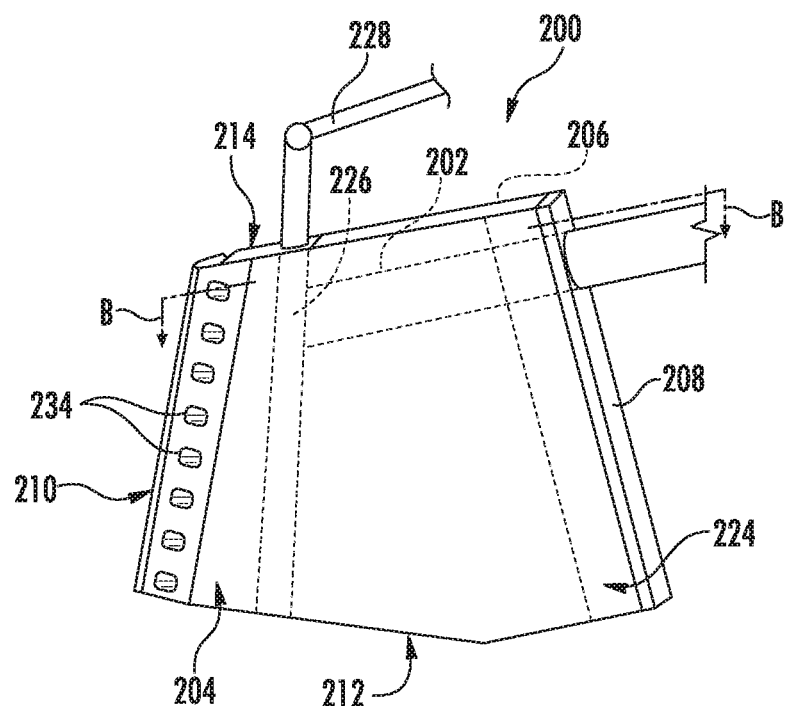
FIG. 8 provides a perspective view illustrating a first side wall of an exemplary panel fuel injector, according to at least one embodiment of the present disclosure.
Figure 9:
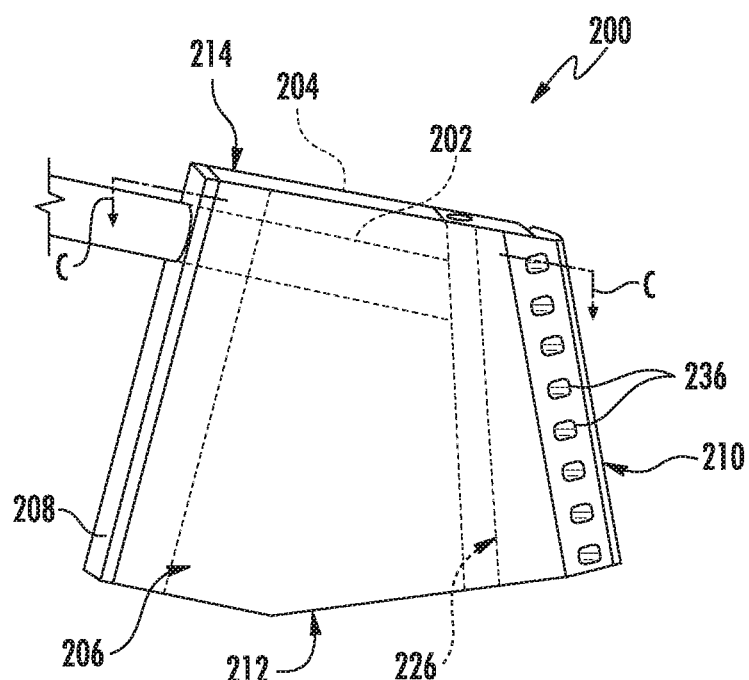
FIG. 9 provides a perspective view of a second side wall of the exemplary fuel injection panel as shown in FIG. 8, according to at least one embodiment of the present disclosure.

FIG. 8 provides a perspective view illustrating a first side wall 204 of an exemplary panel fuel injector 200, according to at least one embodiment of the present disclosure. FIG. 9 provides a perspective view of a second side wall 206 of the exemplary fuel injection panel 200 as shown in FIG. 8, according to at least one embodiment of the present disclosure. As shown in FIGS. 8 and 9 collectively, each panel fuel injector 200 includes a first side wall 204, a second side wall 206, a forward wall or upstream end portion 208, an aft or downstream end 210, a bottom (or radially inner) wall 212 and a top (or radially outer) wall 214. The first side wall 204 and the second side wall 206 terminate and/or are interconnected at the aft end 210.

FIG. 10 provides a cross-sectioned top view, taken along section line B-B as shown in FIG. 8, of the exemplary panel fuel injector 200, according to at least one embodiment of the present disclosure. FIG. 11 provides a cross-sectioned top view, taken along section line C-C as shown in FIG. 9, of the panel fuel injector 200, according to at least one embodiment of the present disclosure. As shown in FIGS. 10 and 11 collectively, the first side wall 204 includes an outer (or hot) side surface 216 and an inner (or cold) side surface 218. As shown in FIGS. 10 and 11 collectively, the second side wall 206 includes an outer (or hot) side surface 220 and an inner (or cold) side surface 222. The outer side surface 216 of the first side wall 204 and the outer side surface 220 of the second side wall 206 are exposed to combustion gases during operation of the combustion system 36.

In various embodiments, as shown in FIGS. 8, 9, 10, and 11 collectively, each panel fuel injector 200 includes a premix air plenum or pocket 224 (shown in hidden lines in FIGS. 8 and 9) and one or more fuel distribution plenums 226 (shown in hidden lines in FIGS. 8 and 9) defined within the respective panel fuel injector 200 between the respective first side wall 204 and the second side wall 206. As shown in FIGS. 8 and 9, the fuel distribution plenum 226 and/or the premix air plenum 224 may extend radially between the respective radially inner wall 212 and the radially outer wall 214. In particular embodiments, the fuel distribution plenum 226 may be in fluid communication with a fuel supply (not shown) via the fluid conduit 202. In particular embodiments, as shown in FIG. 8, the fuel distribution plenum 226 may be in fluid communication with a fuel supply (not shown) via a fluid conduit or coupling 228 that extends radially outwardly from the top wall 214 and/or the bottom wall 212. Thus, the delivery of fuel 28 into the panel injector wall 200 may occur in an axial direction or a radial direction, relative to the center line of the combustor 16.

In various embodiments, as shown in FIGS. 10 and 11 collectively, the panel fuel injector 200 includes a plurality of premix channels that are radially stacked, that extend within the panel fuel injector 200 between the first side wall 204 and the second side wall 206, and that are in fluid communication with the premix air plenum 224 and the fuel distribution plenum 226. In particular embodiments, the plurality of premix channels includes a plurality of first side premixing channels 230 and a plurality of second side premixing channels 232 radially stacked within the panel fuel injector 200 between the first side wall 204 and the second side wall 206.

In particular embodiments, as shown in FIGS. 10 and 11, one or more of the first side premixing channels 230 extends axially along the inner surface 222 of the second side wall 206 and before curving partially around the fuel distribution plenum 226 towards the first side wall 204 where it terminates at a corresponding first side injection aperture 234 defined along the first side wall 204. In particular embodiments, as shown in FIGS. 10 and 11, one or more of the second side premixing channels 232 extends axially along the inner surface 218 of the first side wall 204 and then curves partially around the fuel distribution plenum 226 towards the second side wall 206 where it terminates at a corresponding second side injection aperture 236 defined along the second side wall 206. For purposes of discussion herein, a "first side" premixing channel 230 is so-identified based on the side wall 204 on which its outlet (injection aperture 234) is located. Likewise, a "second side" premixing channel 232 is so-identified based on having an outlet (injection aperture 236) on the second side wall 206.

In particular embodiments, the first side premixing channels 230 and/or the second side premixing channels 232 may traverse or wind between the first side wall 204 and the second side wall 206 of the panel fuel injector 200. In one embodiment, the first side premixing channels 230 and/or the second side premixing channels 232 may traverse radially inwardly and/or outwardly between the first side wall 204 and the second side wall 206 rather than along a straight or constant axial or longitudinal plane of the panel fuel injector 200. The first side premixing channels 230 and/or the second side premixing channels 232 may be oriented at different angles within the panel fuel injector 200. In particular embodiments, one or more of the first side premixing channels 230 and/or the second side premixing channels 232 may be formed with varying sizes and/or geometries. In particular embodiments, one or more of the premixing channels 232, 234 may include a mixing-enhancing feature therein, such as a bend, a kink, a twist, a helical portion, turbulators, or the like.

As shown in FIG. 11, each first side premixing channel 230 includes an air inlet 238, which is in fluid communication with the premix air plenum 224. In particular embodiments, one or more of the first side premixing channels 230 is in fluid communication with the fuel distribution plenum 226 via a respective fuel port 240. In various embodiments, as shown in FIG. 8, the respective first side injection apertures 234 are radially spaced and/or stacked along the first side wall 204.

As shown in FIG. 10, each second side premixing channel 232 includes an air inlet 242, which is in fluid communication with the premix air plenum 224. In particular embodiments, one or more of the second side premixing channels 230 is in fluid communication with the fuel distribution plenum 226 via a respective fuel port 244. In various embodiments, as shown in FIG. 9, the respective second side injection apertures 236 are radially spaced and/or stacked along the second side wall 206.

It is contemplated that the panel fuel injector 200 may have premixing channels (230 or 232) that terminate in injection apertures located along a single side wall (either the first side wall 204 or the second side wall 206, respectively). Thus, while reference is made herein to embodiments having injection apertures 234, 236 on both the first side wall 204 and the second side wall 206, it should be understood that there is no requirement that both the first side wall 204 and the second side wall 206 have injection apertures 234, 236 for delivering a fuel-air mixture unless recited in the claims. Additionally, the injection apertures 234, 236 may be uniformly sized and spaced (as shown), or may be non-uniformly sized and/or spaced, as needs dictate.

In particular embodiments, the panel fuel injector 200 may be made as an integrated or unitary component, via casting, additive manufacturing (such as by 3D printing techniques), or other similar manufacturing processes. By forming the panel fuel injector 200 as a unitary or integrated component, the need for seals between the various features of the panel fuel injector 200 may be reduced or eliminated, part count and costs may be reduced, and assembly steps may be simplified or eliminated. In other embodiments, the panel fuel injector 200 may be fabricated, such as by welding, or may be formed from different manufacturing techniques, where components made with one technique are joined to components made by another technique. In particular embodiments, at least a portion or all of each panel fuel injector 200 may be formed from a ceramic matrix composite (CMC) or other composite material.

Figure 12:
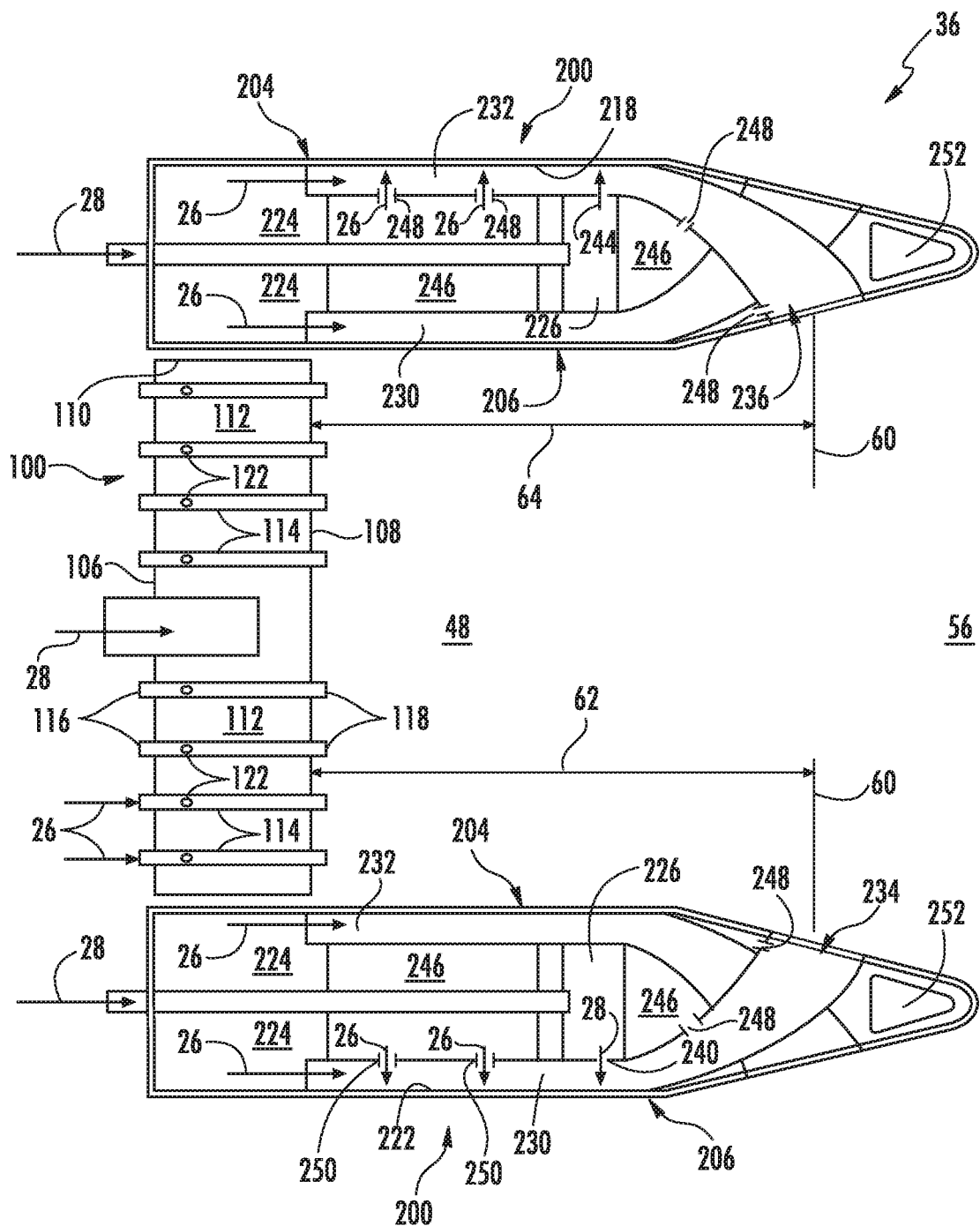
FIG. 12 provides a cross-sectioned top view of a bundled tube fuel nozzle and a pair of circumferentially adjacent panel fuel injectors, according to at least one embodiment of the present disclosure.

FIG. 12 provides a cross-sectioned top view of a portion of the annular combustion system 36 including one bundled tube fuel nozzle 100 of the plurality of bundled tube fuel nozzles 100 and a pair of circumferentially adjacent panel fuel injectors 200 of the plurality of panel fuel injectors 200, according to various embodiments of the present disclosure. As shown in FIG. 12, each respective primary combustion zone 48 is defined upstream from the corresponding first side injection apertures 234 and second side injection apertures 236 of a pair of circumferentially adjacent panel fuel injectors 200. As shown in FIG. 12, a secondary combustion zone 56 is defined downstream from the corresponding first side injection apertures 234 and second side injection apertures 236 of the pair of circumferentially adjacent panel fuel injectors 200.

As shown in FIG. 12, the first side injection apertures 234 and the second side injection apertures 236 of two circumferentially adjacent fuel injection panels 200 of the plurality of panel fuel injectors 200 define respective first side and second side injection plane(s) 58, 60, respectively, from which a second fuel and air mixture is injected into a flow of combustion gases originating from the respective primary combustion zone 48. The first side injection plane 58 is defined at a first axial distance 62 from the aft plate 108 of the respective bundled tube fuel nozzle 100. The second side injection plane 60 is defined at a second axial distance 64 from the aft plate 108 of the respective bundled tube fuel nozzle 100.

In particular embodiments (such as the embodiment shown in FIG. 12), the first axial distance 62 of the first side injection plane 58 and the second axial distance 64 of the second side injection plane 60 may be coincident (i.e., at the same axial distance from the aft plate 108 of the respective bundled tube fuel nozzle 100). In other embodiments (such as the embodiment shown in FIG. 13), the first side injection plane 58 and the second side injection plane 60 may be defined or axially staged at different axial distances from the aft plate 108 of the respective bundled tube fuel nozzle 100 (i.e., the first axial distance 62 is different from the second axial distance 64).

Although the plurality of first side injection apertures 234 are shown in FIG. 8 in a common radial or injection plane 58, in some embodiments, one or more of the first side injection apertures 234 may be staggered axially with respect to radially adjacent first side injection apertures 234, thereby off-setting the axial distance 60 of one or more of the first side injection apertures 234. Similarly, although the plurality of second side injection apertures are shown in FIG. 9 in a common radial or injection plane 60, in some embodiments, one or more of the second side injection apertures 236 may be staggered axially with respect to radially adjacent second side injection apertures 236, thereby off-setting the axial distance 62 of one or more of the second side injection apertures 236. The amount of off-set of the first side injection apertures 234 may be different from the amount of off-set of the second side injection apertures 236.

Figure 13:
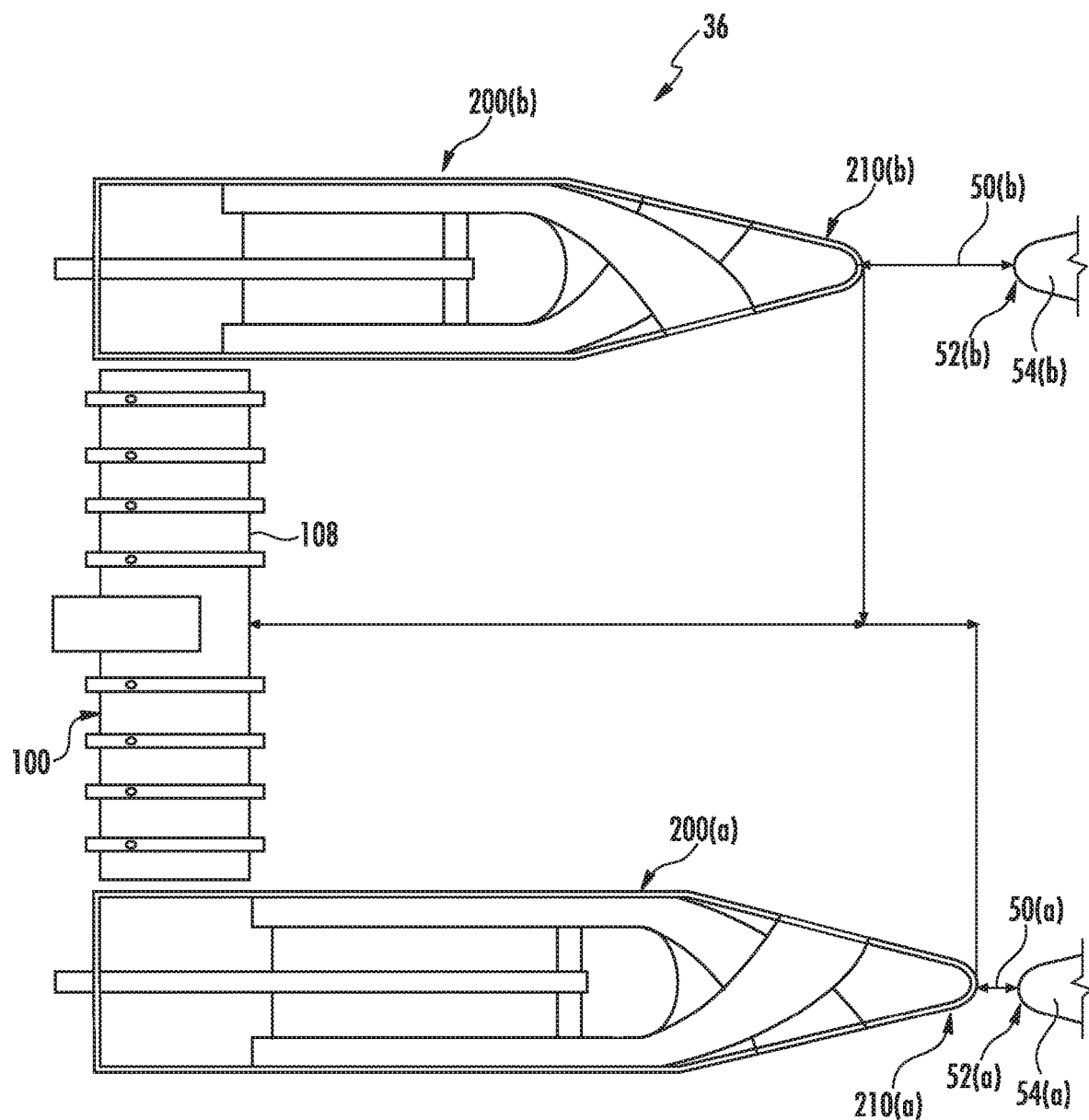
FIG. 13 provides a cross-sectioned top view of a bundled tube fuel nozzle and a pair of circumferentially adjacent panel fuel injectors, according to at least one embodiment of the present disclosure.

FIG. 13 provides a cross-sectioned top view of a portion of the annular combustion system 36 including one bundled tube fuel nozzle 100 of the plurality of bundled tube fuel nozzles 100 and a pair of circumferentially adjacent panel fuel injectors 200 of the plurality of panel fuel injectors 200, according to various embodiments of the present disclosure. In particular embodiments, the aft end 210(a) of a first panel fuel injector 200(a) of the plurality of panel fuel injectors 200 may be positioned axially downstream, with respect to the aft plate 108 of a respective bundled tube fuel nozzle 100, from the aft end 210(b) of a second panel fuel injector 200(b) of the plurality of panel fuel injectors 200. In other words, an axial gap 50(a) defined between the aft end 210(a) of the panel fuel injector 200(a) and a leading edge 52(a) of a stationary nozzle 54(a) may be smaller than an axial gap 50(b) defined between the aft end 210(b) of panel fuel injector 200(b) and a leading edge 52(b) of a second stationary nozzle 54(b).

Referring again to FIG. 12, during axially staged operation of the combustion system 36, a portion of the compressed air 26 from the compressor 14 flows through the inlets 116 of the tubes 114 of the bundled tube fuel nozzles 100 while fuel 28 is supplied to the respective fuel plenums 112. The fuel 28 is injected via fuel ports 122 into the flow of compressed air within the tubes 114. The fuel and air mix within each tube 114 to provide a primary fuel-air mixture to the primary combustion zone 48. The primary fuel-air mixture is burned in the primary combustion zone 48 to produce a hot effluent stream of combustion gases. In the case of the exemplary bundled tube fuel nozzles 100 illustrated herein, relatively short flames originate from the outlets 118 of each of the tubes 114 in each corresponding primary (or first) combustion zone 48. The hot effluent stream flows downstream towards the first side injection plane 58 and the second side injection plane 60.

A portion of the compressed air 26 is routed into the premix air plenum 224 of the panel fuel injectors 200. The compressed air 26 is routed from the premix air plenum 224 into the respective inlet 238 of each of the first side premixing channels 230 and into the respective inlet 242 of each second side premixing channels 232. Fuel 28 is supplied to the fuel distribution plenum 226 via fluid conduit 202 and/or fluid conduit 228. As the compressed air 26 flows through the first side premixing channels 230 and the second side premixing channels 232 of the respective panel fuel injectors 200, the fuel may be injected into the first side premixing channels 230 via respective fuel ports 240 and/or into each of the second side premixing channels 232 via fuel ports 244.

The fuel and air mix within the first side premixing channels 230 of a first panel fuel injector 200 to provide a first premixed stream of fuel and air to the first side injection plane 58 via the first side injection apertures 234. The fuel and air mix within the second side premixing channels 232 of a circumferentially adjacent panel fuel injector 200 to provide a second premixed stream of fuel and air to the second side injection plane 60 via the second side injection apertures 236. In at least one embodiment, it may be desirable to have the secondary fuel and air introduction occur from a single side (e.g., the first side wall 204 or the second side wall 206) of the panel fuel injector 200. The first side injection apertures 234 and/or the second side injection apertures 236 may be arranged in one or more radial or axial planes.

The hot effluent stream and the first and second premixed streams of fuel and air react in the secondary combustion zone 56. The hot effluent stream from the primary combustion zone 48, approximately 40% to 95% of total combustion gas flow, accelerates until reaching the injection planes 58 and/or 60, where the balance of fuel and air flow, via the first and second premixed streams, is added into the secondary combustion zone 56. In one embodiment, approximately 50% of total combustion gas flow originates from the primary combustion zone 48, and the remaining approximately 50% originates from the secondary combustion zone 56. This arrangement enables sufficient time to achieve CO conversion to CO2 and to minimize NOx formation at the lower temperatures of the primary combustion zone and prior to the elevated gas temperatures that occur between the first and second side injection planes 58, 60 and the stationary nozzle 54, thereby minimizing overall NOx emissions.

Circumferential dynamics modes are common in traditional annular combustors. However, largely due to axially staged secondary fuel-air injection, the segmented annular combustion system 36 described and illustrated herein does not allow these dynamic modes to exist. Further, because each combustor segment is isolated from circumferentially adjacent segments, multi-can dynamics is mitigated or non-existent.

During operation of the segmented annular combustion system 36, it may be necessary to cool one or more of the first side wall 204, the second side wall 206, the stationary nozzle 54, the inner liner 300 and/or the outer liner 400 in order to enhance mechanical performance of the individual components. In order to accommodate cooling requirements, one or more of the first side wall 204, the second side wall 206, the stationary nozzle 54, the inner liner 300 and/or the outer liner 400 may include various air passages or cavities, which may be in fluid communication with the high pressure plenum 34 formed within the compressor discharge casing 32 and/or with the premix air plenum 224 defined within each panel fuel injector 200.

In particular embodiments, as shown in FIG. 12, one or more of the fuel ports 244 may be angled, shaped or formed so as to impinge or direct a jet of fuel 28 from the fuel distribution plenum 226 onto the inner surface 218 of the first side wall 204, thereby providing impingement cooling thereto. In particular embodiments, the compressed air 26 flowing from the premix air plenum 224 may provide convective cooling to the inner surface 218 of the first side wall 204.

In particular embodiments, as shown in FIG. 12, one or more of the fuel ports 240 may be angled, shaped or formed so as to impinge or direct a jet of fuel 28 from the fuel distribution plenum 226 onto the inner surface 222 of the second side wall 206, thereby providing impingement cooling thereto.

As shown in FIG. 12, a cooling air cavity or pocket 246 may be defined within the panel fuel injector 200 between the first side wall 204 and the second side wall 206. One or more ports 248 may be angled, shaped or formed so as to impinge or direct a jet of compressed air 26 from the cooling air cavity 246 onto the inner surface 218 of the premixing channel 232. In the exemplary embodiment shown, the inner surface 218 of the premixing channel 232 is coincident with the first side wall 204, thereby providing impingement cooling thereto.

In particular embodiments, the compressed air 26 flowing from the premix air plenum 224 may provide convective cooling to the inner surface 222 of the second side wall 206. One or more ports 250 may be angled, shaped or formed so as to impinge or direct a jet of compressed air 26 from the cooling air cavity 246 onto the inner surface 222 of the premixing channel 230. In the exemplary embodiment shown, the inner surface 222 of the premixing channel 230 is coincident with the second side wall 206, thereby providing impingement cooling thereto.

FIG. 12 also illustrates that the fuel distribution plenum 226 is flanked on an upstream side by the cooling air cavity 246 and on the downstream side by a continuation of the cooling air cavity 246. Downstream of the fuel port 240, 244, the premixing channels 230, 232 include a curved end section that directs the fuel/air mixture to the respective injection aperture 234, 236. The curved end section includes an inner radius and an outer radius. Ports 248 may be provided in the inner radius of the curved portion, the ports 248 being in fluid communication with the downstream portion of the cooling air cavity 246, to direct a film of air along an interior surface of the curved portion of the premixing channel 230, 232, thereby preventing the flow from stagnating along the wall of the premixing channel 232, 234.

Figure 14:
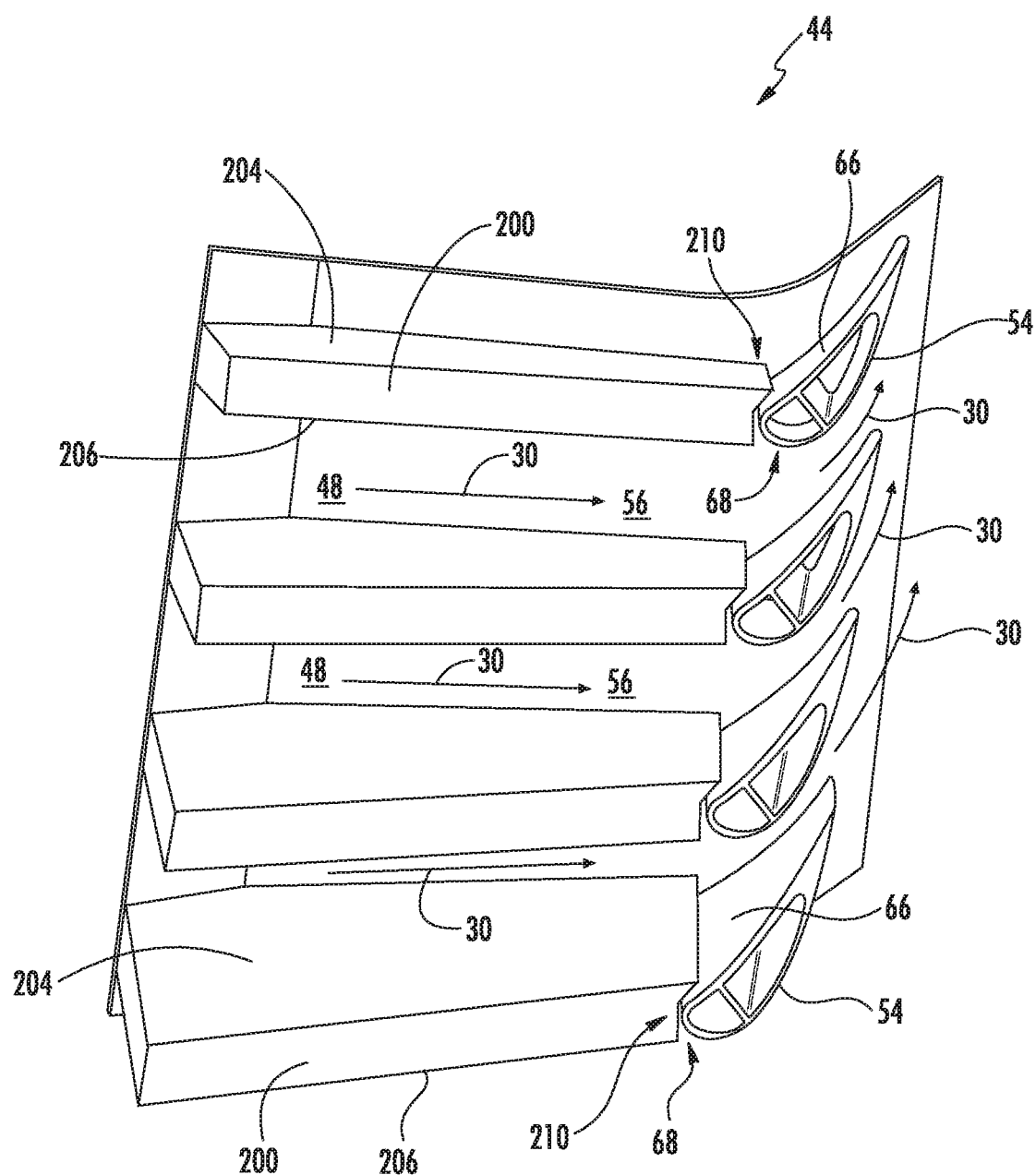
FIG. 14 provides a simplified perspective view of an exemplary arrangement of panel fuel injectors and turbine nozzles, according to at least one embodiment of the present disclosure.
Figure 15:
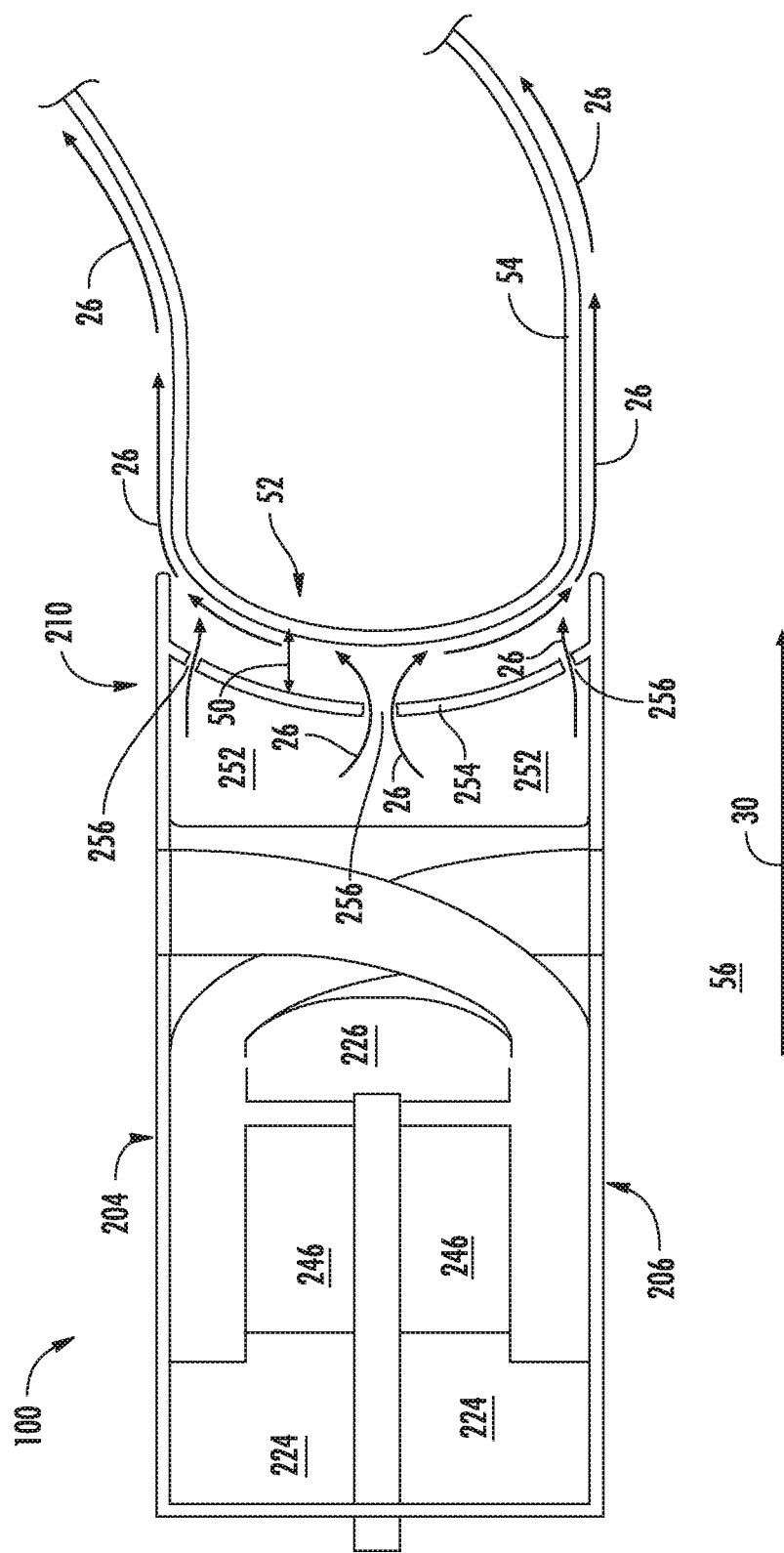
FIG. 15 is an enlarged cross-sectioned top view of an arrangement between an exemplary panel fuel injector and a portion of an exemplary stationary nozzle, according to one or more embodiments of the present disclosure.

FIG. 14 is a simplified perspective view of an exemplary combustor segment 44, according to at least one embodiment of the present disclosure. FIG. 15 is an enlarged cross-sectioned top view of an exemplary panel fuel injector 200 and includes a portion of an exemplary stationary nozzle 54, according to one or more embodiments of the present disclosure. In particular embodiments, as shown in FIGS. 14 and 15 collectively, the aft end 210 of at least one panel fuel injector 200 is disposed proximate, adjacent, immediately adjacent or next to a respective leading edge 52 of a respective stationary nozzle 54. As such, the respective axial gap 50 defined between the aft end 210 of the panel fuel injector 200 and the leading edge 52 of the respective stationary nozzle 54 is minimalized, thereby at least partially shielding the respective leading edge 52 from the flow of combustion gases 30. For example, the axial gap 50 between the aft end 210 and the leading edge of a respective stationary nozzle 54 may be less than six inches, less than three inches, less than two inches, or less than one inch. Further, in these embodiments, the secondary combustion zones 56 are separated from one another, and the number of secondary combustion zones 56 is equal to the number of primary combustion zones 48.

In particular embodiments, as shown in FIG. 14, the aft end at least one of the first side wall 204 and the second side wall 206 may extend axially past the leading edge 52 towards the trailing edge and/or partially across a pressure side wall 66 or a suction side wall 68 of the stationary nozzle 54, thereby at least partially shielding a portion of the pressure side wall 66 and/or the suction side wall 68 from the flow of combustion gases 30.

In particular embodiments, as shown in FIG. 15, at least one panel fuel injector 200 includes a cooling air plenum 252 defined between the first side wall 204 and the second side wall 206 proximate to the aft end 210. An aft wall 254 or the aft end 210 of the panel fuel injector 200 may be arcuate or concave or otherwise complementary in shape to the leading edge 52 of a respective stationary nozzle 54. For example, the aft end 210 of the panel fuel injector 200 may define a pocket or slot, and the leading edge 52 of the stationary nozzle 54 may extend into the pocket. One or more cooling holes 256 may be defined along the aft wall 254. The cooling holes 256 are in fluid communication with the cooling air plenum 252. During operation, compressed air 26 may flow from the cooling air plenum 252, though the cooling holes 256 and into the axial gap 50, thereby providing at least one of impingement and film cooling to the corresponding stationary nozzle 54, particularly to the leading edge 52 of the corresponding stationary nozzle 54.

Figure 16:
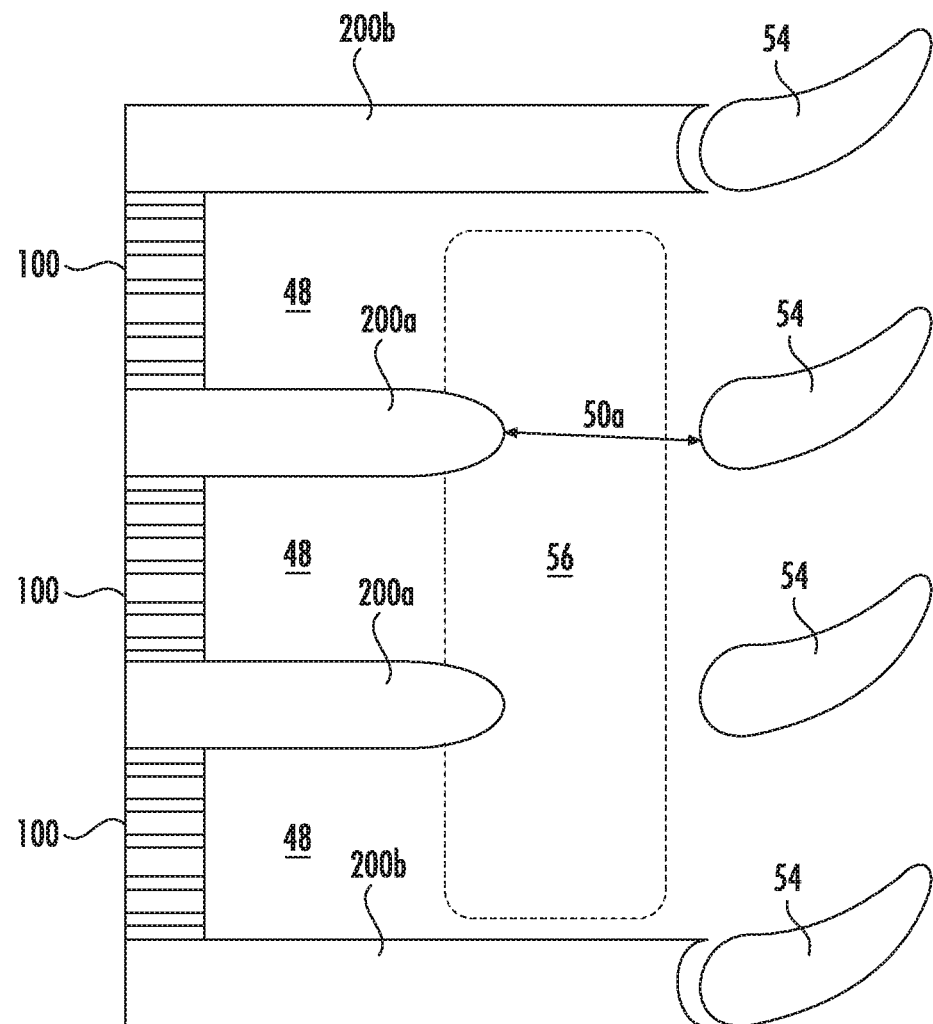
FIG. 16 provides a simplified perspective view of an exemplary arrangement of panel fuel injectors and turbine nozzles, according to at least one embodiment of the present disclosure.

Alternately, as shown in FIG. 16, the combustor 36 may include a first set of panel fuel injectors 200a that define a first axial gap 50a between a respective aft end 210 and a corresponding stationary nozzle 54 ("short" panel fuel injectors, as in FIG. 7) and a second set of panel fuel injectors 200b that define a second axial gap 50b between a respective aft end 210 and a corresponding stationary nozzle 54 ("long" panel fuel injectors, as in FIG. 14). The number of panel fuel injectors 200b in the second set may be smaller than the number of panel fuel injectors 200a in the first set. In some embodiments, the panel fuel injectors 200b in the second set are spaced circumferentially apart from one another (i.e., are not adjacent). In this exemplary configuration, which may be useful for mitigating dynamics, the number of secondary combustion zones 56 is smaller than the number of primary combustion zones 48. That is, the secondary combustion zones 56 are formed axially downstream of the aft ends 210 of the panel fuel injectors 200a in the first set and extend circumferentially between the panel fuel injectors 200b of the second set.

Figure 17:
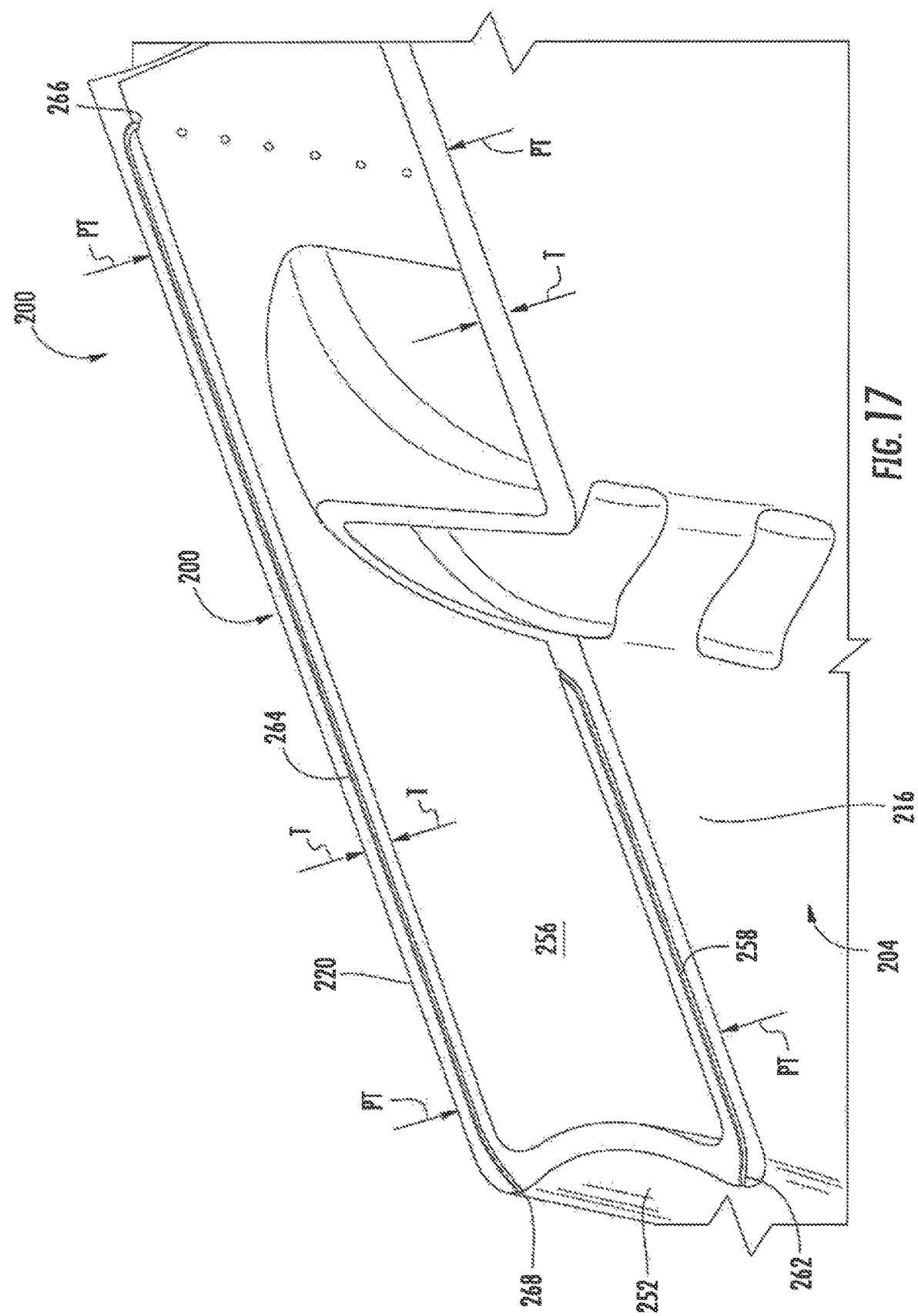
FIG. 17 provides a top cross-sectioned perspective view of a portion of an exemplary panel fuel injector, according to at least one embodiment of the present disclosure.

FIG. 17 provides a top cross-sectioned perspective view of a portion of an exemplary panel fuel injector 200, according to at least one embodiment of the present disclosure. In particular embodiments, as shown in FIG. 17, the first side wall 204 may define a plurality of first side micro-cooling channels 258 that extend between and/or is defined between the inner surface 218 and the outer surface 216 of the first side wall 204. Each first side micro-cooling channel 258 includes a respective inlet 260 and a respective outlet 262. The respective inlet 260 to one or more of the first side micro-cooling channels 258 may be in fluid communication with the cooling air plenum 252, the cooling air cavity 246, the premix air plenum 223 or other compressed air or cooling fluid source. The respective outlet 262 of one or more of the first side micro-cooling channels 258 may be defined along the aft wall 254 of the panel fuel injector 200. Although the first side micro-cooling channels 258 are shown as extending substantially axially or linearly through the first side wall 204, it should be noted that one or more of the first side micro-cooling channels 258 may extend between the inner surface 218 and the outer surface 216 in a serpentine or curved pattern.

In particular embodiments, as shown in FIG. 17, the second side wall 206 may define a plurality of second side micro-cooling channels 264 that extend between the inner surface 222 and the outer surface 220 of the second side wall 206. Each second side micro-cooling channel 264 includes a respective inlet 266 and a respective outlet 268. The respective inlet 266 to one or more of the second side micro-cooling channels 264 may be in fluid communication with the cooling air plenum 252, the cooling air cavity 246, the premix air plenum 224 (FIG. 15) or other compressed air or cooling fluid source. The respective outlet 268 of one or more of the second side micro-cooling channels 264 may be defined along the aft wall 254 of the panel fuel injector 200. Although the second side micro-cooling channels 264 are shown as extending substantially axially or linearly through the second side wall 206, it should be noted that one or more of the second side micro-cooling channels 264 may extend between the inner surface 222 and the outer surface 220 in a serpentine or curved pattern.

In particular embodiments, as shown in FIG. 17, a wall thickness T of either or both of the first side wall 204 and the second side wall 206 of the panel fuel injector 200 may vary along the axial or longitudinal length and/or along a radial span of the panel fuel injector 200. For example, the wall thickness of either or both of the first side wall 204 and the second side wall 206 of the panel fuel injector 200 may vary between the upstream end portion 208 and the aft end 210 and/or between the radially inner wall 212 and the radially outer wall 214 (FIG. 9).

In particular embodiments, as illustrated in FIG. 17, an overall injection panel thickness PT may vary along the axial or longitudinal length and/or along a radial span of the panel fuel injector 200. For example, the first side wall 204 and/or the second side wall 206 may bulge outwardly towards and/or into the flow of combustion gases flowing between two circumferentially adjacent panel fuel injectors 200. The bulge or variation in overall injection panel thickness PT may occur at any point along the radial span and/or the axial length of the respective first side wall 204 or the second side wall 206. Panel thickness PT or the position of the bulged region may vary along the axial length and/or the radial span of first side wall 204 or the second side wall 206 the passage to tailor the local hot passage areas to achieve a certain target velocity and residence time profile without requiring a change in wall thickness T.

Figure 18:
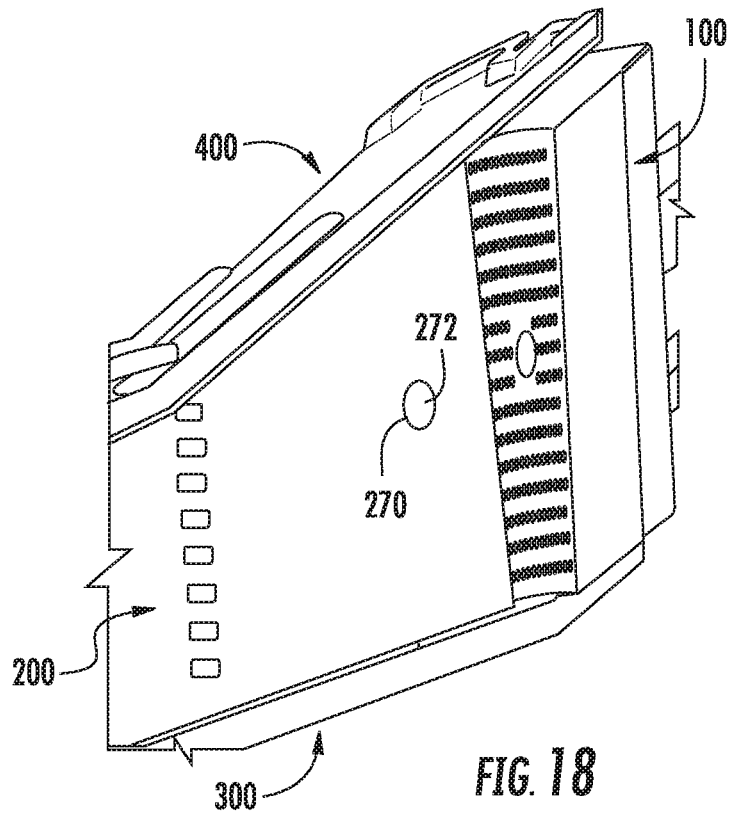
FIG. 18 provides a perspective view of an exemplary panel fuel injector, a bundled tube fuel nozzle, a portion of an inner liner and a portion of an outer liner, according to at least one embodiment of the present disclosure.
Figure 19:
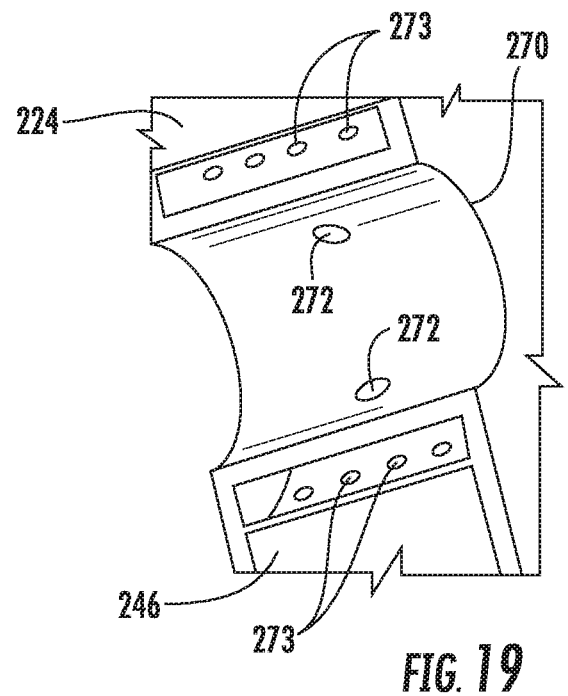
FIG. 19 provides an enlarged cross-sectioned view of a portion of the panel fuel injector as shown in FIG. 18, according to at least one embodiment of the present disclosure.

FIG. 18 provides a perspective view of an exemplary panel fuel injector 200, bundled tube fuel nozzle 100, a portion of the inner liner 300 and a portion of the outer liner 400, according to at least one embodiment of the present disclosure. FIG. 19 provides an enlarged cross-sectioned view of a portion of the panel fuel injector 200 as shown in FIG. 17, according to at least one embodiment. In particular embodiments, as shown in FIGS. 18 and 19 collectively, at least one of the panel fuel injectors 200 may define at least one cross-fire opening 270 that extends through the first side wall 204 and the second side wall 206 of the respective panel fuel injector 200. The cross-fire opening 270 permits cross-fire and ignition of circumferentially adjacent primary combustion zones 48.

In one embodiment, the cross-fire opening 270 is defined by a double-walled cylindrical structure with an air volume therebetween. The combustion gases 30, ignited in a first combustion zone 48, are permitted to flow through the inner wall of the cross-fire opening 270 into an adjacent primary combustion zone 48, where ignition of the fuel and air mixture in the adjacent primary combustion zone 48 occurs. To prevent combustion gases 30 from stagnating in the cross-fire opening 270, purge air holes 272 are provided in the inner wall. In addition to purge air holes 272, the outer walls of the cross-fire openings 270 may be provided with air feed holes 273 that may be in fluid communication with at least one of the premix air plenum 224, the cooling air cavity 246, or another compressed air source. The purge air holes 272 are in fluid communication with the air volume, which receives air via the air feed holes 273. The combination of smaller air feed holes 273 in the outer wall and larger purge air holes 272 in the inner wall transforms the cross-fire opening 270 into a resonator for mitigating potential combustion dynamics within the segmented annular combustion system 36.

Figure 20:
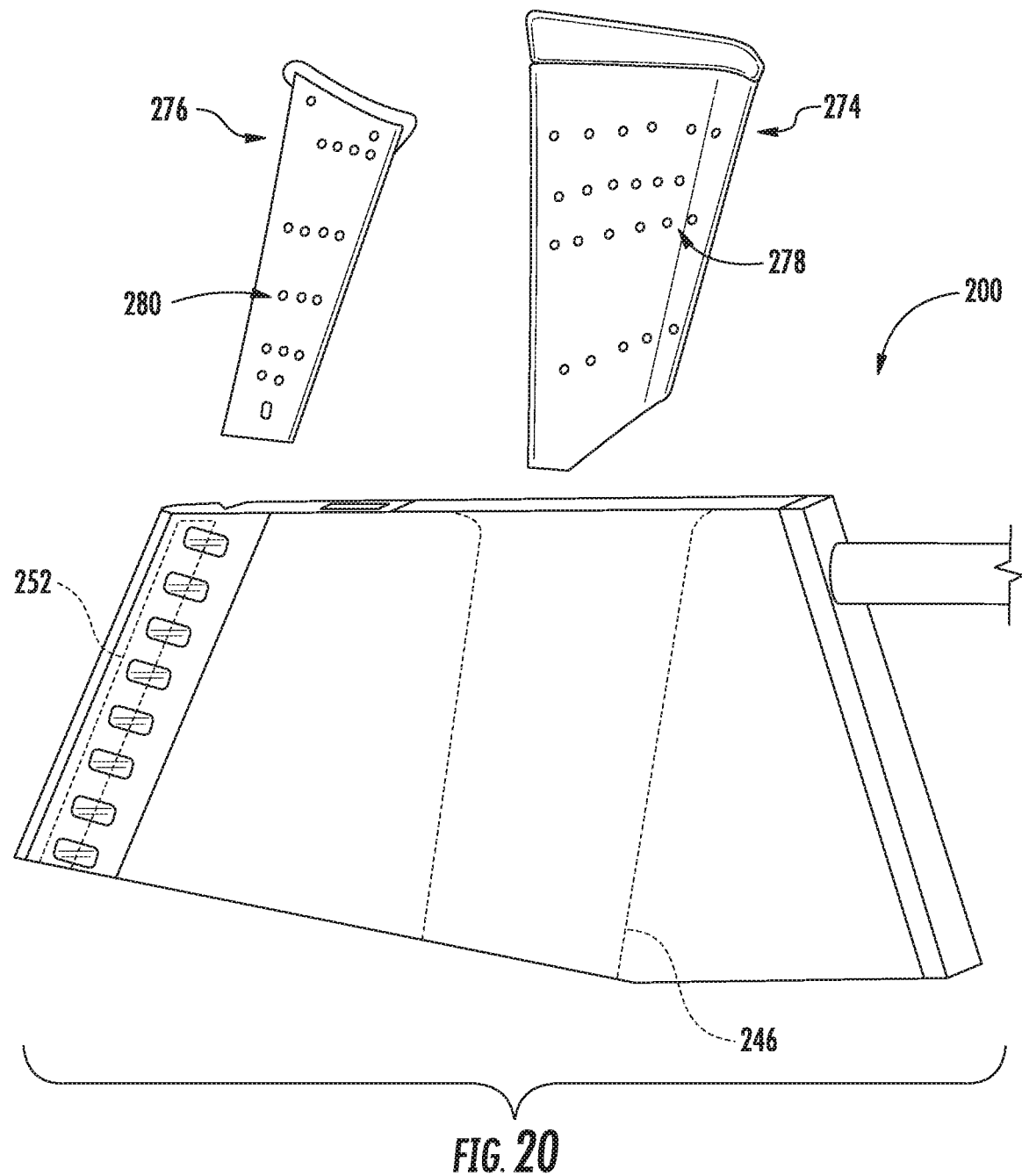
FIG. 20 provides a perspective view of a portion of an exemplary panel fuel injector according to at least one embodiment of the present disclosure.

FIG. 20 provides a perspective view of a portion of an exemplary panel fuel injector 200, according to at least one embodiment. In particular embodiments, as shown in FIG. 20, at least one impingement air insert 274, 276 may be disposed within a respective air cavity such as the cooling air cavity 246 and/or the cooling air plenum 252 defined within a respective panel fuel injector 200 of the plurality of panel fuel injectors 200. The impingement air inserts 274, 276 include walls that are complementary in shape to the cooling air cavity 246 and cooling air plenum 252, respectively. The impingement air inserts 274, 276 include at least one open end through which air may flow. At least one of the impingement air insert(s) 274, 276 may include or define a plurality of cooling or impingement holes 278, 280 oriented and/or formed to direct multiple discrete jets of air onto one or more inner surfaces 218, 222 (FIGS. 10 & 11) of the respective panel fuel injector 200 at discrete locations to provide jetted or impingement cooling thereto.

Figure 21:
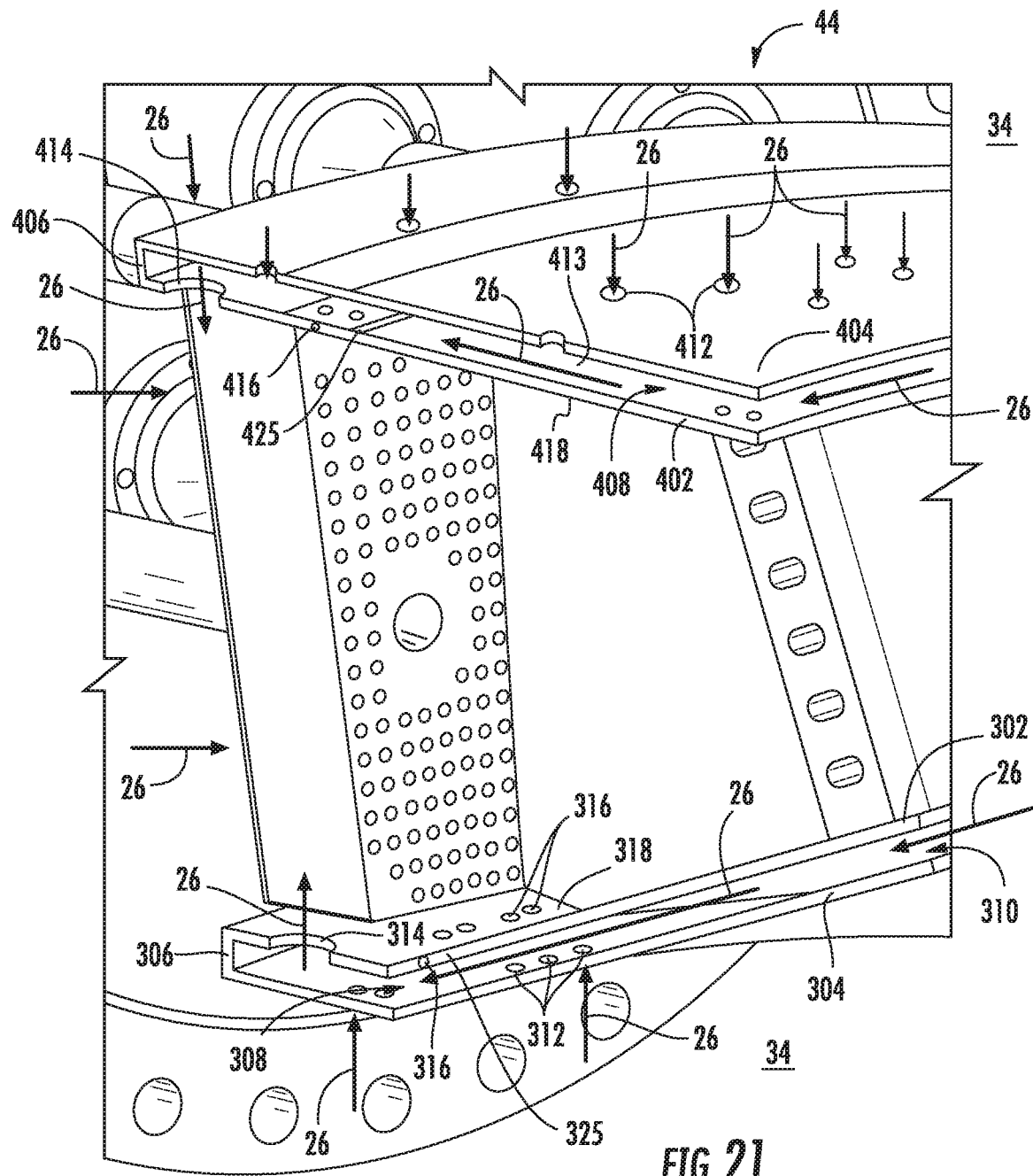
FIG. 21 provides a perspective view of a portion of an exemplary combustor segment, according to at least one embodiment of the present disclosure.

FIG. 21 provides a perspective view of a portion of an exemplary combustor segment 44, according to at least one embodiment of the present disclosure. In particular embodiments, as shown in FIG. 21, the inner liner 300 and the outer liner 400 are double-banded structures, each defining a respective flow annulus between an inner band and an outer band. In these embodiments, the inner liner 300 and the outer liner 400 are cooled by impingement and/or film cooling.

Specifically, in these embodiments, the inner liner 300 includes an inner band 302 that is radially spaced from an outer band 304. In at least one embodiment, a wall 306 extends radially between the inner band 302 and the outer band 304. The inner band 302, the outer band 304, and the wall 306 (when present) define an inner flow annulus 308 therebetween.

In particular embodiments, an inlet 310 to the inner flow annulus 308 is defined at a downstream end of the inner liner 300. In particular embodiments, the inner flow annulus 308 is in fluid communication with the compressor 16 via the high pressure plenum 34 and the inlet 310. In particular embodiments, the outer band 304 may define a plurality of apertures 312. In operation, the apertures 312 provide for fluid communication between the high pressure plenum 34 and the inner flow annulus 308. In particular embodiments, one or more apertures 312 of the plurality of apertures 312 is oriented to direct jets of cooling air against a cool side surface 313 of the inner band 302 of the inner liner 300.

In particular embodiments, the inner band 302 defines a primary aperture 314. In operation, the primary aperture 314 provides for fluid communication between the inner flow annulus 308 and a respective panel fuel injector 200. For example, in particular embodiments, the primary aperture 312 may provide for compressed air flow between the inner flow annulus 308 and one or more of the premix air plenum 224, the cooling air cavity 246 and the cooling air plenum 252. In particular embodiments, the inner band 302 may define a plurality of secondary apertures 316. During operation, compressed air 26 from the inner flow annulus 308 may flow through the secondary apertures 316, thereby providing a cooling film of the compressed air 26 across an outer or hot side surface 318 of the inner band 302.

In particular embodiments, as shown in FIG. 21, the outer liner 400 includes an inner band 402 that is radially spaced from an outer band 404. In at least one embodiment, a wall 406 extends radially between the inner band 402 and the outer band 404. The inner band 402, the outer band 404, and the wall 406 (when present) define an outer flow annulus 408 therebetween. In particular embodiments, an inlet 410 to the outer flow annulus 408 is defined at a downstream end of the outer liner 400. In particular embodiments, the outer flow annulus 408 is in fluid communication with the compressor 16 via the high pressure plenum 34 and the inlet 410. In particular embodiments, the outer band 404 may define a plurality of apertures 412. In operation, the apertures 412 provide for fluid communication between the high pressure plenum 34 and the outer flow annulus 408. In particular embodiments, one or more apertures 412 of the plurality of apertures 412 is oriented to direct jets of cooling air against a cool side surface of the inner band 402 of the outer liner 400.

In particular embodiments, the inner band 402 defines a primary aperture 414. In operation, the primary aperture 414 provides for fluid communication between the outer flow annulus 408 and a respective panel fuel injector 200. For example, in particular embodiments, the primary aperture 414 may provide for compressed air flow between the outer flow annulus 408 and one or more of the premix air plenum 224, the cooling air cavity 246, and the cooling air plenum 252. In particular embodiments, the inner band 402 may define a plurality of secondary apertures 416. During operation, compressed air 26 from the outer flow annulus 408 may flow through the secondary apertures 416, thereby providing a cooling film of the compressed air 26 across an inner or hot side surface 418 of the inner band 402.

Figure 22:
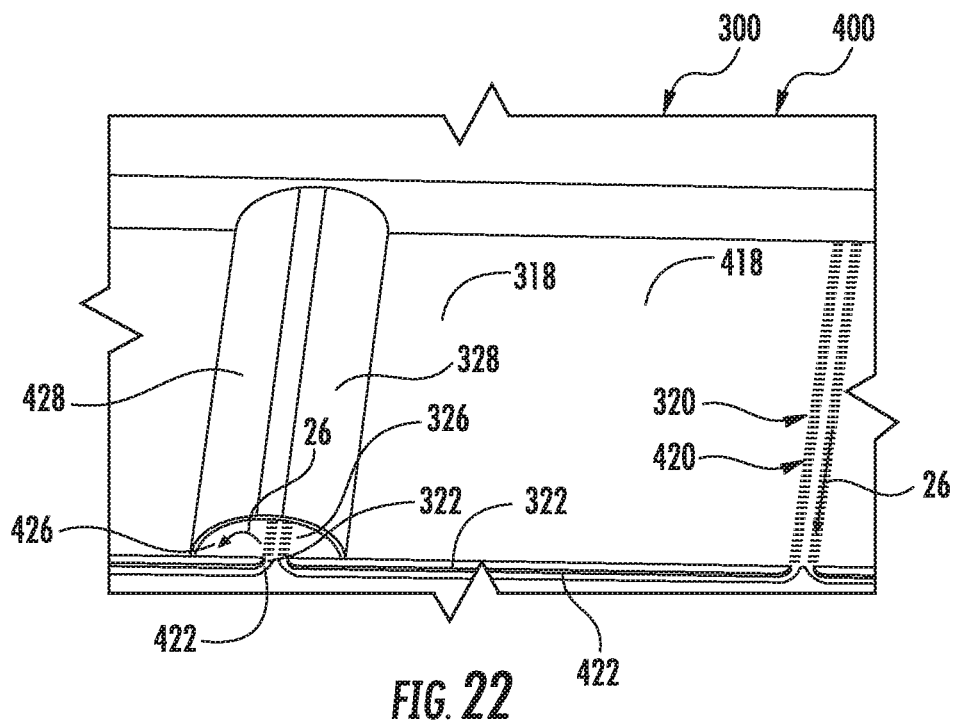
FIG. 22 provides an illustration representing either a portion of an exemplary an inner liner or a portion of an exemplary outer liner, according to at least one embodiment of the present disclosure.
Figure 23:
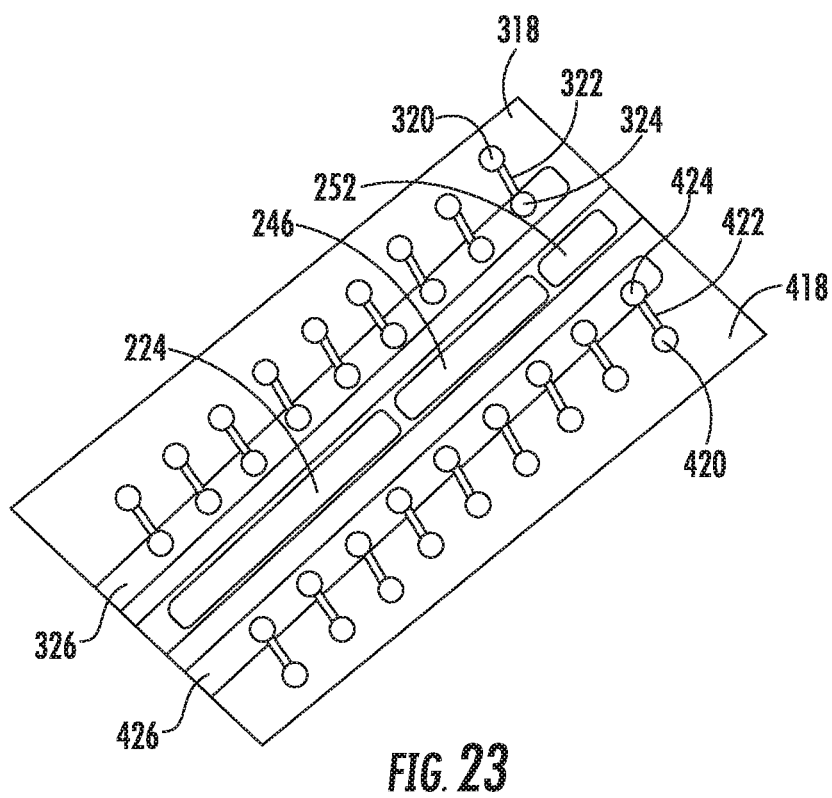
FIG. 23 provides an illustration representing either a portion of an exemplary inner liner or a portion of an exemplary outer liner, according to at least one embodiment of the present disclosure.

FIGS. 22 and 23 are intended to be illustrative of a portion of either or both the inner band 302 of the inner liner 300 or the inner band 402 of the outer liner 400, according to particular embodiments of the present disclosure. In these embodiments, the inner liner 300 and the outer liner 400 are single-wall structures through which micro-channel cooling passages are disposed, as described below. Thus, the cooling of the inner liner 300 and the outer liner 400 is accomplished via convective cooling, rather than impingement and/or film cooling as described with reference to FIG. 21.

In particular embodiments, as shown in FIGS. 22 and 23, the outer or cool side surface of the inner liner 300 and/or the outer or cool side surface 413 of the outer liner 400 may define or include a plurality of inlet holes 320, 420 for receiving compressed air 26 from the high-pressure plenum 34 (FIG. 2). Each inlet hole 320, 420 may be integrated with a micro-channel cooling passage 322, 422 that terminates at a corresponding outlet hole or exhaust port 324, 424. The length of the micro-channel cooling passages 322, 422 may vary in different areas of the liner 300, 400.

In particular embodiments, the length of some or all of the micro-channel cooling passages 322, 422 may be less than about ten inches. In particular embodiments, the length of some or all of the micro-channel cooling passages 322, 422 may be less than about five inches. In particular embodiments, the length of some or all of the micro-channel cooling passages 322, 422 may be less than about two inches. In particular embodiments, the length of some or all of the micro-channel cooling passages 322, 422 may be less than about one inch. In particular embodiments, one or more of the micro-channel cooling passages 322, 422 may be between 0.5 inches and 6 inches. The length of the various micro-channel cooling passages 322, 422 may be determined by the heat pick-up capability of the air flowing therethrough (i.e., the temperature of the cooling air), the diameter of the micro-channel passage, and the temperature of the liner 300, 400 in the area to be cooled.

In particular embodiments, one or more of the outlet holes 324, 424 may be located along the respective outer surface 318, 418 and may deposit the compressed air 26 from the respective inlet holes 320, 420 into a respective flow passage or collection channel 326, 426. In at least one embodiment, as shown in FIG. 22, the collection channel 326, 426 may be defined by a duct 328, 428 that extends along the respective outer surface 318, 418. The respective collection channel 326, 426 may convey at least a portion of the compressed air 26 to the premix air plenum 224 (FIG. 12) of the panel fuel injector 200 where it may be distributed to the various first side premixing channels 230 and/or the second side premixing channels 232. More details about micro-channel cooling using this approach are described in commonly assigned U.S. patent application Ser. No. 14/944,341, filed Nov. 18, 2015.

In particular embodiments, one or more of the micro-channel cooling passages 322, 422 may be oriented so as to provide for compressed air flow between one or more of the premix air plenum 224, the cooling air cavity 246 and the cooling air plenum 252. Thus, the compressed air 26 from one or more of the micro-channel cooling passages 322, 422 may be mixed with the compressed air 26 that is used to cool the interior of the panel fuel injector 200.

In particular embodiments, it is possible to use micro-channel cooling and impingement cooling. For example, the outlet holes 324, 424 of one or more of the micro-channel cooling passages 322, 422 may be located along a side wall 325, 425 (FIG. 21) of the inner band 302 or the inner band 402, such that the compressed air 26 flows through the micro-channel cooling passages 322, 422 and then between two circumferentially adjacent inner liners 300 or adjacent outer liners 400 along a split line defined between the two adjacent inner or outer liners 300, 400, thereby creating a fluid seal therebetween. In one embodiment, the outlet holes 324, 424 of one or more of the micro-channel cooling passages 322, 422 may be located along the respective hot side surface 318 of the inner band 302 or the hot side surface 418 of the outer band 404, such that the compressed air 26 flows through the micro-channel cooling passages 322, 422 and then enters either the primary or the secondary combustion chambers or zones 48, 56 as cooling film air.

The various embodiments of the segmented annular combustion system 36, particularly the bundled tube fuel nozzles 100 in combination with the panel fuel injectors 200, the inner liner 300, and outer liner 400 described and illustrated herein provide various enhancements or improvements to the operations and turndown capability over conventional annular combustion systems. For example, during start-up of the segmented annular combustion system 36, the igniters may ignite the fuel and air mixture flowing from the outlets 118 of the tubes 114 of the plurality of tubes 114. As power needs increase, fuel to the panel fuel injectors 200 may be turned on simultaneously or sequentially until each panel fuel injector 200 is operational.

To reduce power output, the fuel flowing to the tubes 114 of the bundled tube fuel nozzles 100 and/or to the panel fuel injectors 200 may be throttled down simultaneously or sequentially as desired. When it becomes desirable or necessary to turn off the panel fuel injectors 200, the fuel may be shut off to each panel fuel injector 200 or to individual panel fuel injectors 200 or groups of the panel fuel injectors 200, thereby minimizing any disturbance to the turbine operation.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A combustion system segment, comprising:
   a first panel fuel injector including a first side wall and a second side wall, the first side wall and the second side wall defining therebetween a premix air plenum, a fuel plenum, and a plurality of first side premixing channels, wherein each first side premixing channel of the plurality of first side premixing channels is in fluid communication with the premix air plenum, the fuel plenum, and a respective first side injection aperture of a plurality of first side injection apertures defined along the first side wall;

a second panel fuel injector circumferentially spaced from the first panel fuel injector, the second panel fuel injector including a first side wall and a second side wall, the first side wall and the second side wall defining therebetween a premix air plenum, a fuel plenum, and a plurality of second side premixing channels, wherein each second side premixing channel of the plurality of second side premixing channels is in fluid communication with the premix air plenum, the fuel plenum, and a respective second side injection aperture of a plurality of second side injection apertures defined along the second side wall; and a fuel nozzle disposed circumferentially between the first side wall of the first panel fuel injector and the second side wall of the second panel fuel injector, the fuel nozzle sealingly engaged with each of the first side wall of the first panel fuel injector and the second side wall of the second panel fuel injector.

2. The combustion system segment as in claim 1, wherein the first side wall of the first panel fuel injector and the second side wall of the second panel fuel injector at least partially define a primary combustion zone downstream from the fuel nozzle and upstream from the plurality of first side injection apertures and the plurality of second side injection apertures.

3. The combustion system segment as in claim 1, further comprising an inner liner radially spaced from an outer liner, wherein the first panel fuel injector and the second panel fuel injector extend radially between the inner liner and the outer liner, and wherein the inner liner and the outer liner define radial flow boundaries therebetween.

4. The combustion system segment as in claim 1, further comprising an end cover formed to connect to an outer casing of a gas turbine, wherein the first panel injector, the fuel nozzle, and the second panel fuel injector are fluidly coupled to the end cover.

5. The combustion system segment as in claim 1, wherein the fuel nozzle is sealingly engaged with the first side wall of the first panel fuel injector via a first seal disposed between a first outer wall of the fuel nozzle and the first side wall of the first panel fuel injector and the fuel nozzle is sealingly engaged with the second side wall of the second panel fuel injector via a second seal disposed between a second outer wall of the fuel nozzle and the second side wall of the second panel fuel injector.

6. The combustion system segment as in claim 1, wherein the first side injection apertures of the plurality of first side injection apertures of the first panel fuel injector are radially spaced along the first side wall, thereby defining a radial injection plane downstream from a primary combustion zone defined between the first side wall of the first panel fuel injector and the second side wall of the second panel fuel injector.

7. The combustion system segment as in claim 1, wherein the second side injection apertures of the plurality of second side injection apertures of the second panel fuel injector are radially spaced along the second side wall, thereby defining a radial injection plane downstream from a primary combustion zone defined between the first side wall of the first panel fuel injector and the second side wall of the second panel fuel injector.

8. The combustion system segment as in claim 1, wherein the plurality of first side injection apertures of the first panel fuel injector define a first radial injection plane downstream from a primary combustion zone defined between the first side wall of the first panel fuel injector and the second side wall of the second panel fuel injector, and wherein the plurality of second side injection apertures of the second panel fuel injector define a second radial injection plane downstream from the primary combustion zone, the first radial plane and the second radial plane being equidistant from an aft plate of the first fuel nozzle with respect to an axial centerline of the first fuel nozzle.

9. The combustion system segment as in claim 1, wherein the plurality of first side injection apertures of the first panel fuel injector define a first radial injection plane downstream from a primary combustion zone defined between the first side wall of the first panel fuel injector and the second side wall of the second panel fuel injector, and wherein the plurality of second side injection apertures of the second panel fuel injector define a second radial injection plane downstream from the primary combustion zone, the first radial plane and the second radial plane being axially offset with respect to each other relative to an aft plate of the fuel nozzle.

10. The combustion system segment as in claim 1, wherein the fuel nozzle comprises a forward plate, an aft plate, an outer shroud, a fuel plenum at least partially defined by the forward plate and the outer shroud, and a plurality of tubes that extend through the forward plate, the fuel plenum, and the aft plate, wherein one or more of the tubes is in fluid communication with the fuel plenum.

11. The combustion system segment as in claim 1, wherein one or more of the first side premixing channels of the plurality of first side premixing channels of the first panel fuel injector extend axially along an inner surface of the second side wall of the first panel fuel injector.

12. The combustion system segment as in claim 1, wherein one or more of the second side premixing channels of the plurality of second side premixing channels of the second panel fuel injector extend axially along an inner surface of the first side wall of the second panel fuel injector.

13. The combustion system segment as in claim 1, wherein the first panel fuel injector extends downstream at a first axial distance from an aft plate of the fuel nozzle, and the second panel fuel injector extends downstream at a second axial distance from the aft plate of the fuel nozzle.

14. The combustion system segment as in claim 13, wherein the first axial distance is greater than or less than the second axial distance.

15. The combustion system segment as in claim 1, wherein the first panel fuel injector includes a plurality of second side premixing channels defined between the first side wall and the second side wall and a plurality of second side injection apertures defined along the second side wall, wherein each second side premixing channel is in fluid communication with the premix air plenum, the fuel plenum, and a respective second side injection aperture of the plurality of second side injection apertures.

16. The combustion system segment as in claim 1, wherein the second panel fuel injector includes a plurality of first side premixing channels defined between the first side wall and the second side wall and a plurality of first side injection apertures defined along the first side wall, wherein each first side premixing channel is in fluid communication with the premix air plenum, the fuel plenum, and a respective first side injection aperture of the plurality of first side injection apertures.

17. A combustion system, comprising:

a plurality of panel fuel injectors arranged in an annular array about an axial centerline of the combustion system and a plurality of fuel nozzles, wherein each fuel nozzle of the plurality of fuel nozzles is disposed circumferentially between a respective adjacent pair of panel fuel injectors of the plurality of panel fuel injectors and is sealingly engaged with each panel fuel injector of the respective adjacent pair of panel fuel injectors;

wherein the plurality of fuel nozzles includes a first fuel nozzle;

wherein each adjacent pair of panel fuel injectors includes:
- a first panel fuel injector having a first side wall and a second side wall, the first side wall and the second side wall defining therebetween a premix air plenum, a fuel plenum, and a plurality of first side premixing channels, wherein each first side premixing channel of the plurality of first side premixing channels is in fluid communication with the premix air plenum, the fuel plenum, and a respective first side injection aperture of a plurality of first side injection apertures defined along the first side wall; and
- a second panel fuel injector circumferentially spaced from the first panel fuel injector via the first fuel nozzle, the second panel fuel injector including a first side wall and a second side wall, the first side wall and the second side wall defining therebetween a premix air plenum, a fuel plenum, and a plurality of second side premixing channels, wherein each second side premixing channel of the plurality of second side premixing channels is in fluid communication with the premix air plenum, the fuel plenum, and a respective second side injection aperture of a plurality of second side injection apertures defined along the second side wall.

18. The combustion system as in claim 17, wherein the first side wall of the first panel fuel injector and the second side wall of the second panel fuel injector at least partially define a primary combustion zone downstream from the first fuel nozzle and upstream from the plurality of first side injection apertures and the plurality of second side injection apertures.

19. The combustion system as in claim 17, further comprising an inner liner radially spaced from an outer liner, wherein the first panel fuel injector and the second panel fuel injector extend radially between the inner liner and the outer liner, and wherein the inner liner and the outer liner define radial flow boundaries therebetween.

20. The combustion system as in claim 19, wherein the inner liner and the outer liner are configured to circumferentially span a subset of adjacent panel fuel injectors of the plurality of panel fuel injectors.

21. The combustion system as in claim 17, further comprising an end cover formed to connect to an outer casing of a gas turbine, wherein the first panel injector, the first fuel nozzle, and the second panel fuel injector are fluidly coupled to the end cover.

22. The combustion system as in claim 21, further comprising a plurality of end covers arranged circumferentially about the axial centerline of the combustion system, wherein a subset of adjacent panel fuel injectors of the plurality of fuel injectors and a subset of the plurality of fuel nozzles disposed between respective panel fuel injectors are coupled to each end cover of the plurality of end covers.

23. The combustion system as in claim 17, wherein the first side injection apertures of the plurality of first side injection apertures of the first panel fuel injector are radially spaced along the first side wall, thereby defining a radial injection plane downstream from a primary combustion zone defined between the first side wall of the first panel fuel injector and the second side wall of the second panel fuel injector.

24. The combustion system as in claim 17, wherein the second side injection apertures of the plurality of second side injection apertures of the second panel fuel injector are radially spaced along the second side wall, thereby defining a radial injection plane downstream from a primary combustion zone defined between the first side wall of the first panel fuel injector and the second side wall of the second panel fuel injector.

25. The combustion system as in claim 17, wherein the plurality of first side injection apertures of the first panel fuel injector define a first radial injection plane downstream from a primary combustion zone defined between the first side wall of the first panel fuel injector and the second side wall of the second panel fuel injector, and wherein the plurality of second side injection apertures of the second panel fuel injector define a second radial injection plane downstream from the primary combustion zone, the first radial plane and the second radial plane being equidistant from an aft plate of the first fuel nozzle with respect to an axial centerline of the first fuel nozzle.

26. The combustion system as in claim 17, wherein the plurality of first side injection apertures of the first panel fuel injector define a first radial injection plane downstream from a primary combustion zone defined between the first side wall of the first panel fuel injector and the second side wall of the second panel fuel injector, and wherein the plurality of second side injection apertures of the second panel fuel injector define a second radial injection plane downstream from the primary combustion zone, the first radial plane and the second radial plane being axially offset with respect to each other relative to an aft plate of the first fuel nozzle.

27. The combustion system as in claim 17, wherein the first panel fuel injector extends downstream at a first axial distance from an aft plate of the first fuel nozzle and the second panel fuel injector extends downstream at a second axial distance from the aft plate of the first fuel nozzle.

28. The combustion system as in claim 27, wherein the first axial distance is different from the second axial distance.

29. The combustion system as in claim 17, wherein the first panel fuel injector includes a plurality of second side premixing channels defined between the first side wall and the second side wall and a plurality of second side injection apertures defined along the second side wall, and wherein each second side premixing channel is in fluid communication with the premix air plenum, the fuel plenum, and a respective second side injection aperture of the plurality of second side injection apertures.

30. The combustion system as in claim 17, wherein the second panel fuel injector includes a plurality of first side premixing channels defined between the first side wall and the second side wall and a plurality of first side injection apertures defined along the first side wall, and wherein each first side premixing channel is in fluid communication with the premix air plenum, the fuel plenum, and a respective first side injection aperture of the plurality of first side injection apertures.

31. The combustion system as in claim 17, wherein a first axial gap is defined between an aft end of the first panel fuel injector and a leading edge of a first stationary nozzle of a turbine.

32. The combustion system as in claim 17, wherein a second axial gap is defined between an aft end of the second panel fuel injector and a leading edge of a second stationary nozzle of a turbine.

* * * * *